(12) United States Patent
Kakinuma

(10) Patent No.: US 11,164,234 B2
(45) Date of Patent: Nov. 2, 2021

(54) IMAGE SEARCHING APPARATUS, PRINTED MATERIAL, AND IMAGE SEARCHING METHOD

(71) Applicant: Akihiro Kakinuma, Kanagawa (JP)

(72) Inventor: Akihiro Kakinuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 16/287,295

(22) Filed: Feb. 27, 2019

(65) Prior Publication Data

US 2019/0287154 A1 Sep. 19, 2019

(30) Foreign Application Priority Data

Mar. 19, 2018 (JP) .............................. JP2018-050609

(51) Int. Cl.
*G06Q 30/00* (2012.01)
*G06Q 30/06* (2012.01)

(52) U.S. Cl.
CPC .............................. *G06Q 30/0631* (2013.01)

(58) Field of Classification Search
CPC .............. G06Q 30/00; G06Q 30/0601; G06Q 30/0613; G06Q 30/0623; G06Q 30/0629; G06Q 30/0631

See application file for complete search history.

(56) References Cited

U.S. PATENT DOCUMENTS

| | | | | |
|---|---|---|---|---|
| 7,987,188 B2 * | 7/2011 | Neylon | ................. | G06F 16/313 707/739 |
| 8,386,336 B1 * | 2/2013 | Fox | ..................... | G06Q 30/0631 705/26.7 |
| 8,417,713 B1 * | 4/2013 | Blair-Goldensohn | ....................... | G06F 16/9535 707/751 |
| 2001/0021914 A1 * | 9/2001 | Jacobi | ..................... | G06Q 30/02 705/14.53 |
| 2005/0162670 A1 * | 7/2005 | Shuler, Jr. | ........... | H04N 1/00408 358/1.2 |
| 2007/0046675 A1 * | 3/2007 | Iguchi | .................... | G06T 11/206 345/441 |
| 2008/0027983 A1 | 1/2008 | Erol et al. | | |
| 2009/0110089 A1 * | 4/2009 | Green | ................... | H04L 5/0037 375/260 |
| 2010/0268661 A1 * | 10/2010 | Levy | ...................... | G06Q 30/02 705/347 |

(Continued)

FOREIGN PATENT DOCUMENTS

| | | |
|---|---|---|
| JP | 2002-132826 | 5/2002 |
| JP | 2008-033943 | 2/2008 |
| JP | 3069565 | 2/2017 |

OTHER PUBLICATIONS

Bankar, Shital, et al. "Plant disease detection techniques using canny edge detection & color histogram in image processing." Int. J. Comput. Sci. Inf. Technol 5.2 (2014): 1165-1168. (Year: 2014).*

*Primary Examiner* — Christopher B Seibert

(74) *Attorney, Agent, or Firm* — IPUSA, PLLC

(57) ABSTRACT

An image searching apparatus includes processing circuitry configured to calculate an evaluation value that indicates a preference of a customer, by using an image feature amount based on an image; and identify an image to be recommended to the customer by using the calculated evaluation value, from among images of a plurality of articles.

11 Claims, 29 Drawing Sheets

(56) References Cited

U.S. PATENT DOCUMENTS

| | | | | |
|---|---|---|---|---|
| 2014/0195931 A1* | 7/2014 | Kwon | .................... | G06Q 30/02 |
| | | | | 715/753 |
| 2014/0351079 A1* | 11/2014 | Dong | ................. | G06Q 30/0631 |
| | | | | 705/26.7 |
| 2015/0379732 A1* | 12/2015 | Sayre, III | ........... | G06Q 30/0623 |
| | | | | 382/164 |
| 2017/0193997 A1* | 7/2017 | Chen | ....................... | G10L 13/08 |

* cited by examiner

| ARTICLE ID | ARTICLE IMAGE | IMAGE FEATURE AMOUNT | | | | |
|---|---|---|---|---|---|---|
| | | FEATURE AMOUNT A | FEATURE AMOUNT B | FEATURE AMOUNT C | ... | FEATURE AMOUNT X |
| ID001 | | A1 | B1 | C1 | ... | X1 |
| ID002 | | A2 | B2 | C2 | ... | X2 |
| ID003 | | A3 | B3 | C3 | ... | X3 |

FIG.5

| ARTICLE ID | ARTICLE IMAGE | EVALUATION VALUE | | | | |
|---|---|---|---|---|---|---|
| | | INDEX | | | | |
| | | SUBDUED +─┼─┼─▮─┼─┼─ FLASHY 0 | ARTIFICIAL +─┼─┼─┼─▮─┼─ NATURAL 0 | PLAIN +─▮─┼─┼─┼─┼─ RICH 0 | ... | HEAVY +─┼─┼─┼─▮─┼─ LIGHT 0 |
| ID001 | 👕 | SUBDUED | ARTIFICIAL | PLAIN | ... | HEAVY |
| ID002 | 👕 | SUBDUED +─┼─┼─▮─┼─┼─ FLASHY | ARTIFICIAL +─┼─┼─▮─┼─┼─ NATURAL | PLAIN +─┼─┼─┼─▮─┼─ RICH | ... | HEAVY +─┼─▮─┼─┼─┼─ LIGHT |
| ID003 | 👚 | SUBDUED +─▮─┼─┼─┼─┼─ FLASHY | ARTIFICIAL +─┼─┼─▮─┼─┼─ NATURAL | PLAIN +─▮─┼─┼─┼─┼─ RICH | ... | HEAVY +─┼─┼─┼─▮─┼─ LIGHT |

| ARTICLE ID | ARTICLE IMAGE | ANALYSIS INFORMATION |||||||
|---|---|---|---|---|---|---|---|
| | | FEATURE AMOUNT A | FEATURE AMOUNT B | FEATURE AMOUNT C | ... | FEATURE AMOUNT X | INDEX |
| ID001 | | A1 | B1 | C1 | ... | X1 | SUBDUED –┼─┼─▨─┼─┼─ FLASHY  ARTIFICIAL –┼─┼─┼─▨─┼─ NATURAL  PLAIN –┼─▨─┼─┼─┼─ RICH  ... HEAVY –┼─┼─┼─▨─┼─ LIGHT |
| ID002 | | A2 | B2 | C2 | ... | X2 | SUBDUED –┼─▨─┼─┼─┼─ FLASHY  ARTIFICIAL –┼─▨─┼─┼─┼─ NATURAL  PLAIN –┼─┼─▨─┼─┼─ RICH  ... HEAVY –┼─▨─┼─┼─┼─ LIGHT |
| ID003 | | A3 | B3 | C3 | ... | X3 | SUBDUED –┼─┼─▨─┼─┼─ FLASHY  ARTIFICIAL –┼─┼─┼─▨─┼─ NATURAL  PLAIN –┼─▨─┼─┼─┼─ RICH  ... HEAVY –┼─┼─▨─┼─┼─ LIGHT |

600

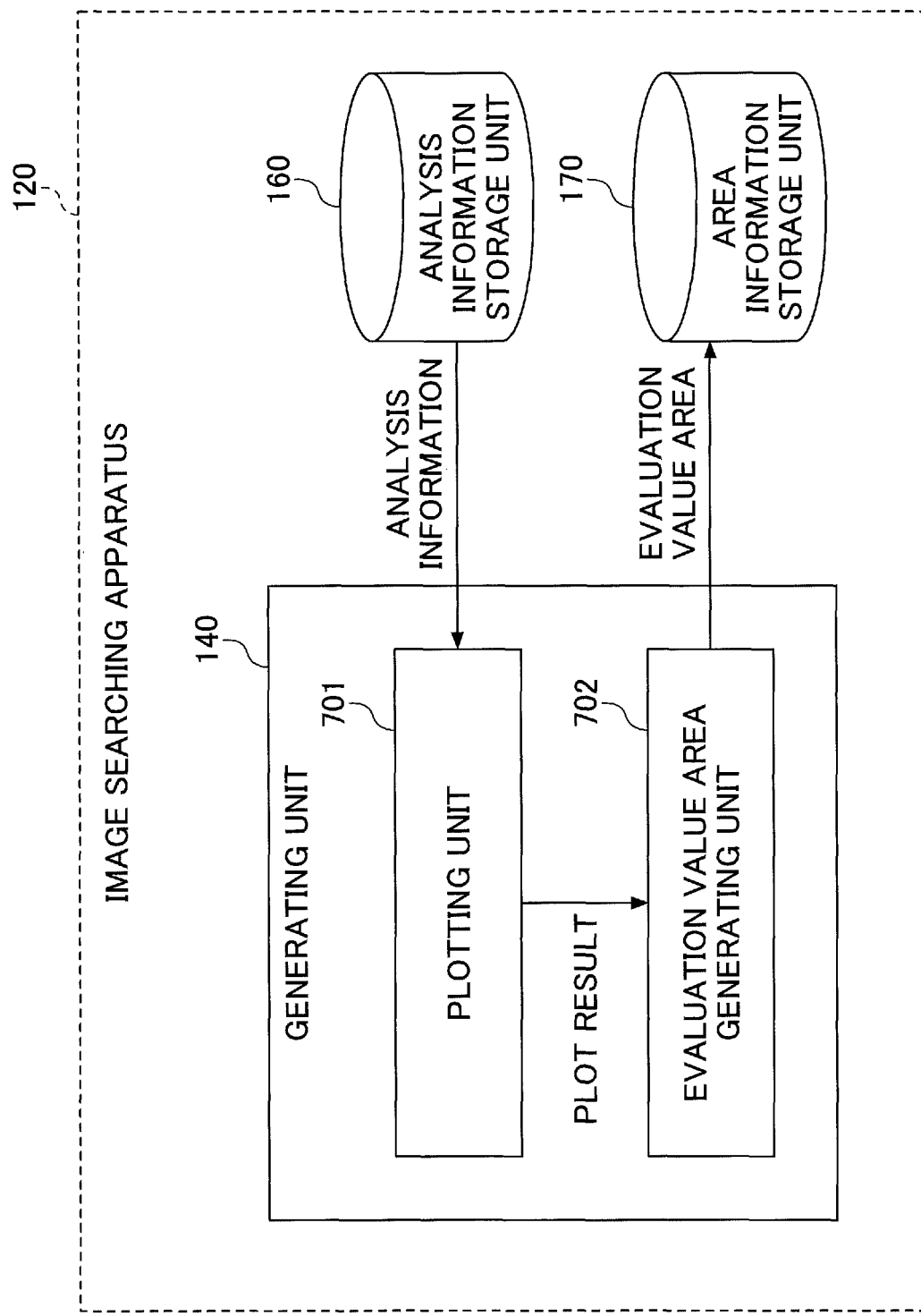

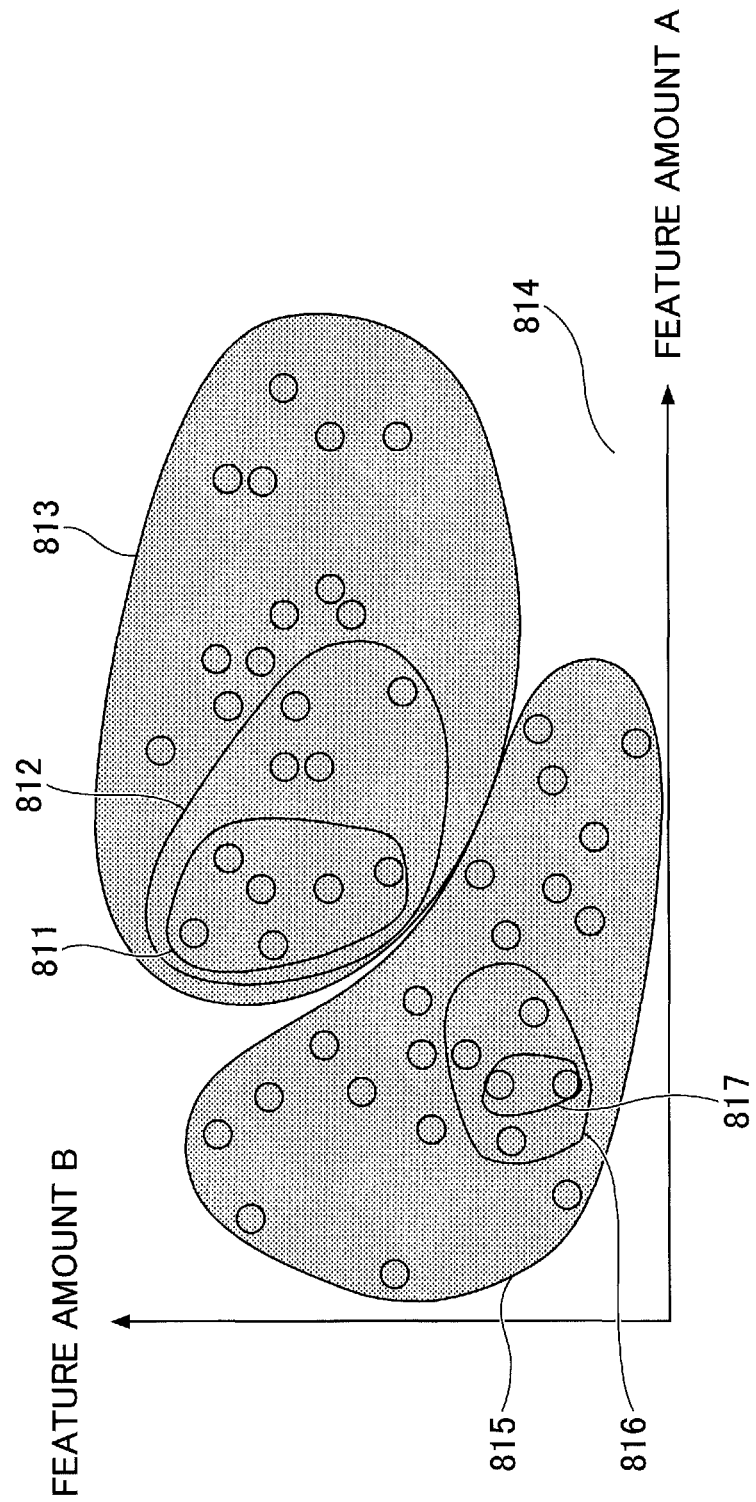

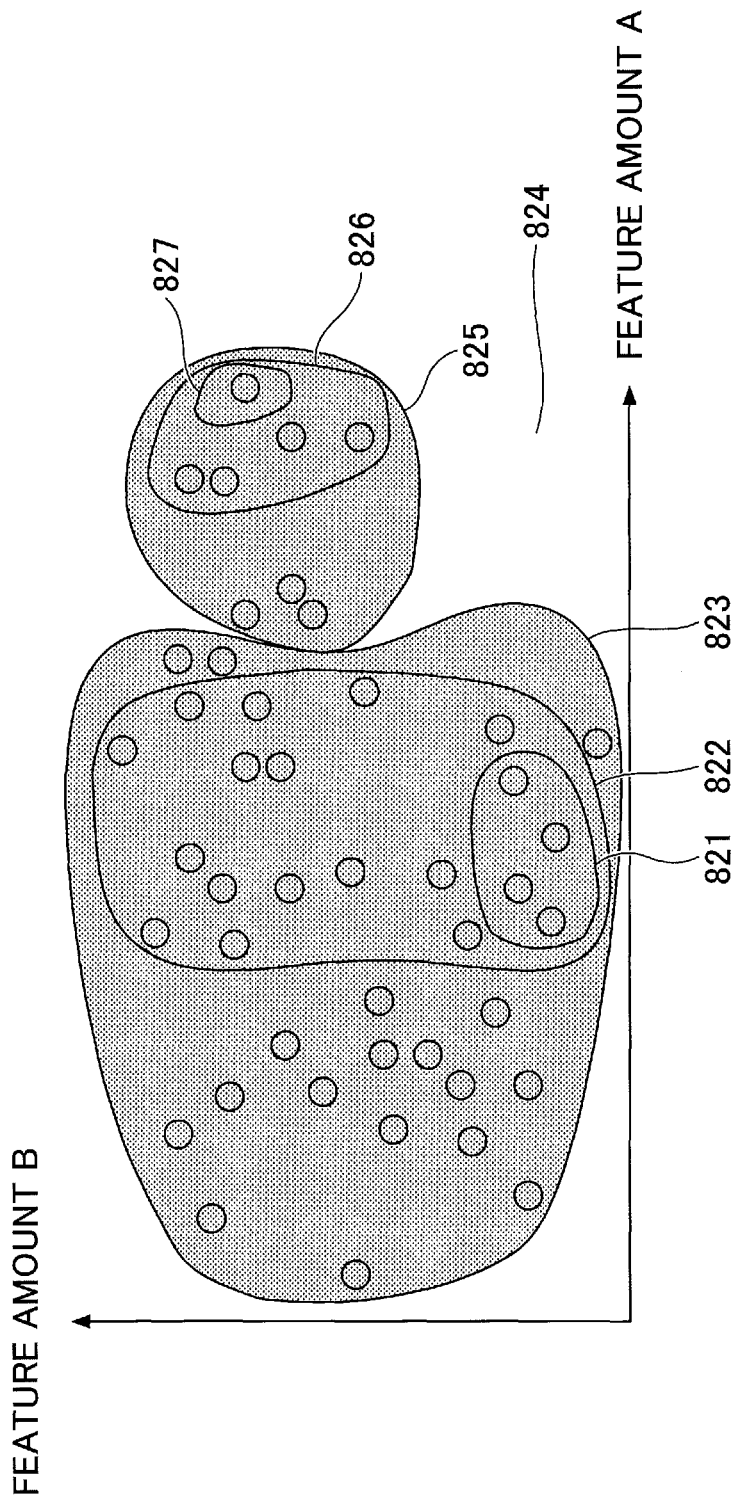

FIG.16

| PRODUCT CATEGORY | IMAGE INFORMATION ||||||
|---|---|---|---|---|---|---|
| | PRODUCT ID | SIZE | COLOR | PRICE | ARTICLE IMAGE |
| T SHIRT | ID2018XXXXX | M | WHITE | ¥1,000 | IMAGE ID001 |
| | ID2018XXXXX | M | WHITE | ¥1,200 | IMAGE ID002 |
| | ID2018XXXXX | M | BLUE | ¥900 | IMAGE ID003 |
| | ID2018XXXXX | M | BLUE | ¥1,000 | IMAGE ID004 |
| | ID2018XXXXX | M | HORIZONTAL STRIPES (WHITE, BLUE) | ¥1,500 | IMAGE ID005 |
| | ⋮ | ⋮ | ⋮ | ⋮ | ⋮ |
| ⋮ | ⋮ | ⋮ | ⋮ | ⋮ | ⋮ |

PURCHASE HISTORY INFORMATION (CUSTOMER INFORMATION=UID001)

| PURCHASE DATE AND TIME | PRODUCT ID | PRODUCT CATEGORY | SIZE | COLOR | PURCHASED QUANTITY | PRICE | PURCHASED ARTICLE IMAGE |
|---|---|---|---|---|---|---|---|
| 2015.5.15 | ID2015XXXXX | BLOUSE | M | WHITE | 1 | ¥4,800 | IMAGE ID001 |
| | ID2015XXXXX | TROUSERS | M | BLACK | 1 | ¥8,000 | IMAGE ID011 |
| 2016.7.20 | ID2016XXXXX | T SHIRT | M | WHITE | 1 | ¥2,900 | IMAGE ID112 |
| 2017.11.2 | ID2017XXXXX | COAT | M | BEIGE | 1 | ¥15,000 | IMAGE ID021 |
| | ID2017XXXXX | SWEATER | M | GREY | 1 | ¥6,500 | IMAGE ID028 |
| ⋮ | ⋮ | ⋮ | ⋮ | ⋮ | ⋮ | ⋮ | ⋮ | ions
IMAGE SEARCHING APPARATUS, PRINTED MATERIAL, AND IMAGE SEARCHING METHOD

CROSS-REFERENCE TO RELATED APPLICATION

The present application is based on and claims priority under 35 U.S.C. § 119 to Japanese Patent Application No. 2018-050609, filed on Mar. 19, 2018, the contents of which are incorporated herein by reference in their entirety.

BACKGROUND OF THE INVENTION

1. Field of the Invention

The present invention relates to an image searching apparatus, a printed material, and an image searching method.

2. Description of the Related Art

In the related art, a technique of recommending an optimum product to a customer, is known. For example, the following Patent Document 1 proposes a technique of analyzing the state of a customer visiting a store, such as an article possessed by the visiting customer, and a product in which the visiting customer expresses interest, and recommending a product according to the analysis result.

Patent Document 1: Japanese Patent No. 6069565

SUMMARY OF THE INVENTION

An aspect of the present invention provides an image searching apparatus, a printed material, and an image searching method, in which one or more of the disadvantages of the related art are reduced.

According to one aspect of the present invention, there is provided an image searching apparatus including processing circuitry configured to calculate an evaluation value that indicates a preference of a customer, by using an image feature amount based on an image; and identify an image to be recommended to the customer by using the calculated evaluation value, from among images of a plurality of articles.

BRIEF DESCRIPTION OF THE DRAWINGS

FIG. 4 is a diagram illustrating an example of an image feature amount according to the first embodiment of the present invention;

FIG. 5 is a diagram illustrating an example of evaluation values according to the first embodiment of the present invention;

FIG. 6 is a diagram illustrating an example of analysis information according to the first embodiment of the present invention;

FIG. 7 is a diagram illustrating details of the functional configuration of a generating unit of the image searching apparatus according to the first embodiment of the present invention;

FIGS. 8A to 8C are diagrams illustrating a plurality of evaluation value areas for each index according to the first embodiment of the present invention;

FIG. 16 is a diagram illustrating an example of image information in a purchasing system according to the third embodiment of the present invention;

FIG. 17 is a diagram illustrating an example of purchase history information in a purchasing system according to the third embodiment of the present invention;

DETAILED DESCRIPTION OF THE PREFERRED EMBODIMENTS

Figure 1:
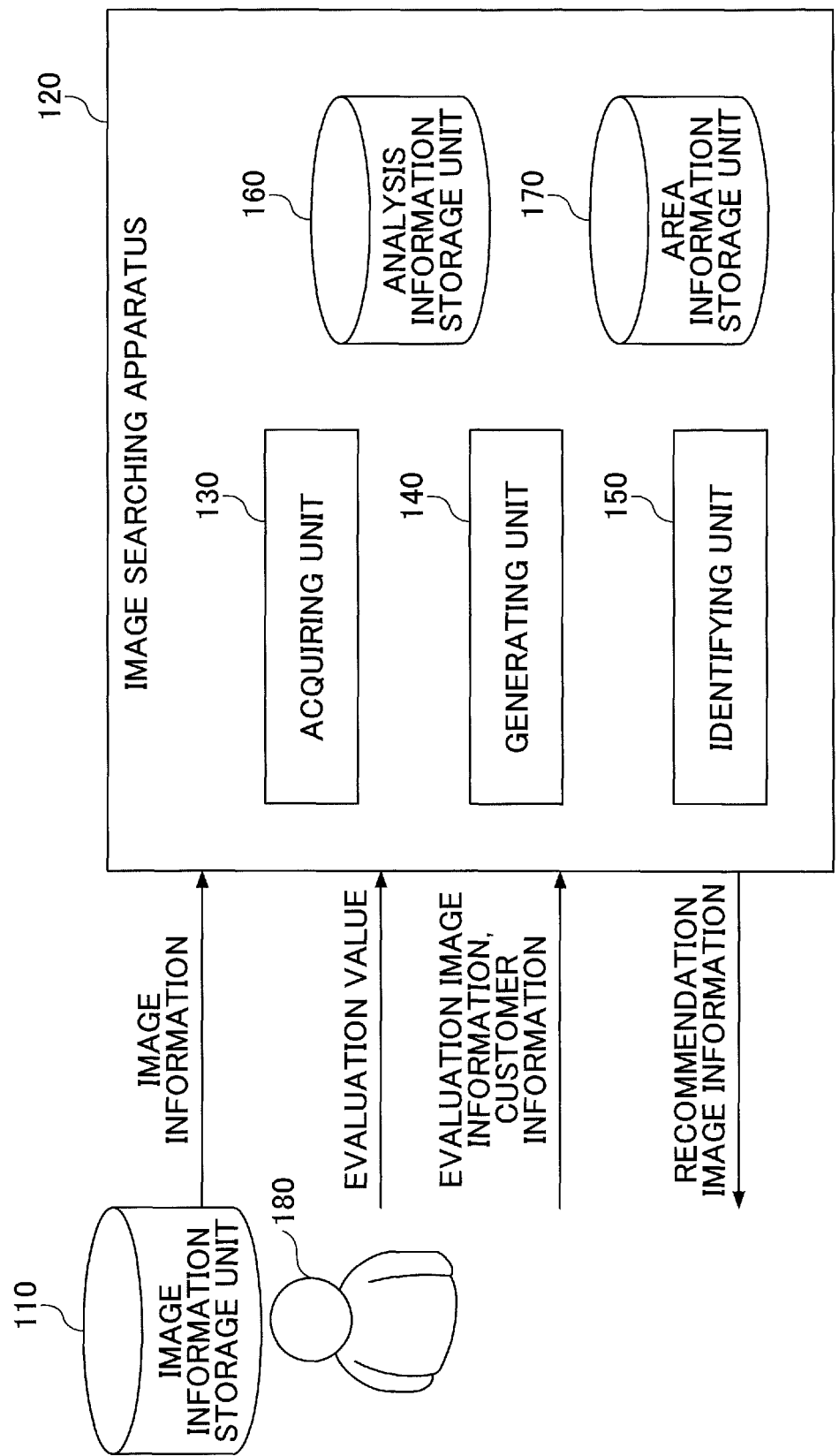
FIG. 1 is a diagram illustrating an example of the functional configuration of an image searching apparatus according to a first embodiment of the present invention.

In the related art, by analyzing an article possessed by a customer visiting a store, and a product in which the visiting customer is expressing interest, etc., it is only possible to capture a temporary state of the customer (only part of the preferences of the customer), and, therefore, it is difficult to recognize the fundamental preference of the customer from the analysis results. On the other hand, if it is possible to recommend a product according to the fundamental preference of the customer, it would be possible to increase the possibility that the customer can efficiently obtain a product that the customer desires.

A problem to be addressed by an embodiment of the present invention is to implement recommendations corresponding to the preference of a customer.

Embodiments of the present invention will be described by referring to the accompanying drawings. In the specification and drawings of the embodiments, the elements having substantially the same functions are denoted by the same reference numerals, and overlapping descriptions are omitted.

First Embodiment

<1. Functional Configuration of Image Searching Apparatus—First Embodiment>

First, the functional configuration of the image searching apparatus according to a first embodiment will be described. FIG. 1 is a diagram illustrating an example of a functional configuration of an image searching apparatus. An image searching program is installed in an image searching apparatus 120, and by executing the program, the image searching apparatus 120 functions as an acquiring unit 130, a generating unit 140, and an identifying unit 150.

The acquiring unit 130 is an example of an acquiring unit. The acquiring unit 130 acquires image information from an image information storage unit 110 stored in an external device. Furthermore, the acquiring unit 130 acquires an evaluation value for a qualitative index with respect to each article image included in the image information, input by an administrator 180 who is managing the image information.

Furthermore, the acquiring unit 130 calculates an image feature amount for each article image included in the acquired image information, and stores the image feature amount in association with the acquired evaluation value, in an analysis information storage unit 160, as analysis information.

The generating unit 140 is an example of a generating unit. Based on the analysis information stored in the analysis information storage unit 160, the generating unit 140 analyzes the association relationship between the distribution of the image feature amount of each article image in a feature amount space, and the evaluation value, based on the analysis information stored in the analysis information storage unit 160, and classifies together the image feature amounts of the respective article images having the same evaluation value, for each index, in a feature amount space. Accordingly, the generating unit 140 generates an evaluation value area indicating an area of the same evaluation value, in the feature amount space, for each index. Furthermore, the generating unit 140 stores the generated evaluation value area in an area information storage unit 170, for each index.

The identifying unit 150 receives the evaluation image information including an image in which the preference of the customer is expressed, and the customer information, from an external device, and calculates an image feature amount of the image included in the evaluation image information. An image in which the customer's preference is expressed refers to an image selected according to the preference of the customer from among a plurality of images. Images selected according to customer's preference may include the following images, for example.

An image of a product purchased (selected) by the customer in the past, from among a plurality of products.

The image of a person wearing clothes favored by the customer and the image of a landscape favored by the customer, selected by the customer from captured images that have been captured in the past.

Images of a painting, a poster, an advertisement, and a product favored by the customer, selected by the customer from among images of a painting, a poster, an advertisement, and a product, etc., that have been acquired in the past.

Furthermore, the identifying unit 150 compares the evaluation value area stored in the area information storage unit 170 with the image feature amount calculated for an image in which the customer's preference is expressed, thereby calculating an evaluation value indicating the preference of the customer.

Furthermore, the identifying unit 150 refers to the analysis information stored in the analysis information storage unit 160, identifies an article image having an evaluation value similar to the calculated evaluation value, and outputs the identified article image to an external device as recommendation image information.

<Hardware Configuration of Image Searching Apparatus—First Embodiment>

Figure 2:
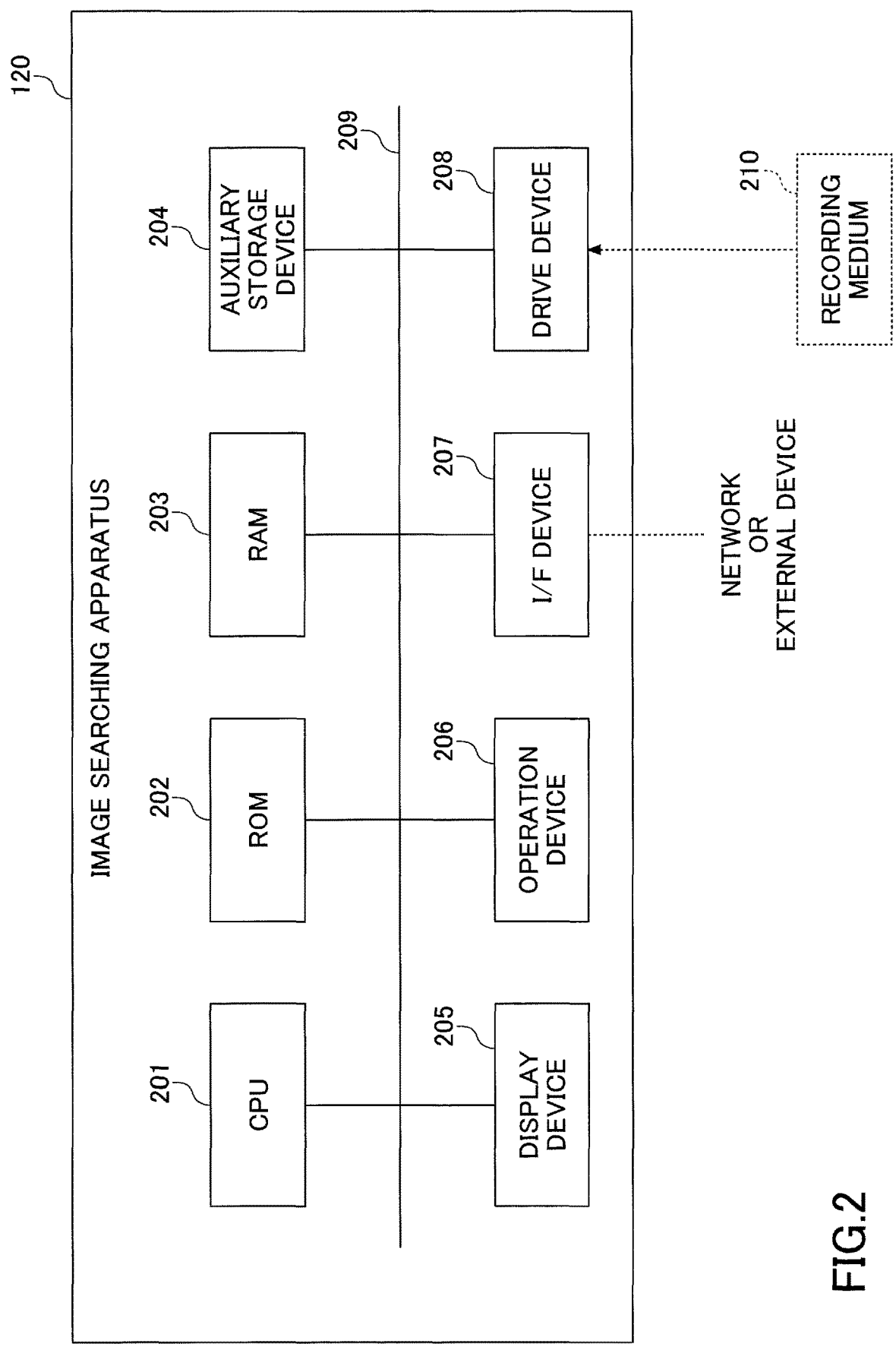
FIG. 2 is a diagram illustrating an example of the hardware configuration of an image searching apparatus according to the first embodiment of the present invention.

Next, the hardware configuration of the image searching apparatus 120 will be described. FIG. 2 is a diagram illustrating an example of the hardware configuration of the image searching apparatus.

As illustrated in FIG. 2, the image searching apparatus 120 includes a Central Processing Unit (CPU) 201, a Read-Only Memory (ROM) 202, and a Random Access Memory (RAM) 203. The CPU 201, the ROM 202, and the RAM 203 form a so-called computer.

Furthermore, the image searching apparatus 120 includes an auxiliary storage device 204, a display device 205, an operation device 206, an interface (I/F) device 207, and a drive device 208. Note that the respective hardware elements of the image searching apparatus 120 are mutually connected to each other via a bus 209.

The CPU 201 is an arithmetic device that executes various programs (for example, an image searching program, etc.) installed in the auxiliary storage device 204.

The ROM 202 is a nonvolatile memory. The ROM 202 functions as a main storage device that stores various programs, data, etc., necessary for the CPU 201 to execute various programs installed in the auxiliary storage device 204. Specifically, the ROM 202 functions as a main storage device for storing boot programs such as a Basic Input/Output System (BIOS) and an Extensible Firmware Interface (EFI), etc.

The RAM 203 is a volatile memory such as a Dynamic Random Access Memory (DRAM) or a Static Random Access Memory (SRAM). The RAM 203 functions as a main storage device that provides a work area to be expanded when various programs installed in the auxiliary storage device 204 are executed by the CPU 201.

The auxiliary storage device 204 is an auxiliary storage device that stores various programs and information used when various programs are executed. For example, the analysis information storage unit 160 and the area information storage unit 170 are implemented in the auxiliary storage device 204.

The display device 205 is a display device for displaying the internal state, etc., of the image searching apparatus 120. The operation device 206 is an input device used when inputting various instructions to the image searching apparatus 120.

The I/F device 207 is a connection device for connecting to a network or an external device.

The drive device 208 is a device for setting a recording medium 210. The recording medium 210 referred to here includes a medium that optically, electrically, or magnetically records information, such as a Compact Disk Read-Only Memory (CD-ROM), a flexible disk, and a magneto-optical disk, etc. Furthermore, the recording medium 210 may include a semiconductor memory, etc., for electrically recording information, such as a ROM and a flash memory, etc.

Note that various programs to be installed in the auxiliary storage device 204 are installed, for example, when the distributed recording medium 210 is set in the drive device 208 and the drive device 208 reads the various programs recorded in the recording medium 210 to be installed. Alternatively, various programs to be installed in the auxiliary storage device 204 may be installed by being downloaded from the network via the I/F device 207.

<3. Detailed Functions of Each Unit of the Image Searching Apparatus—First Embodiment>

Next, the functions of each unit (the acquiring unit 130, the generating unit 140, and the identifying unit 150) of the image searching apparatus 120 will be described in detail.

<3.1 Details of Function of Acquiring Unit—First Embodiment>

(1) Details of Functional Configuration of Acquiring Unit

Figure 3:
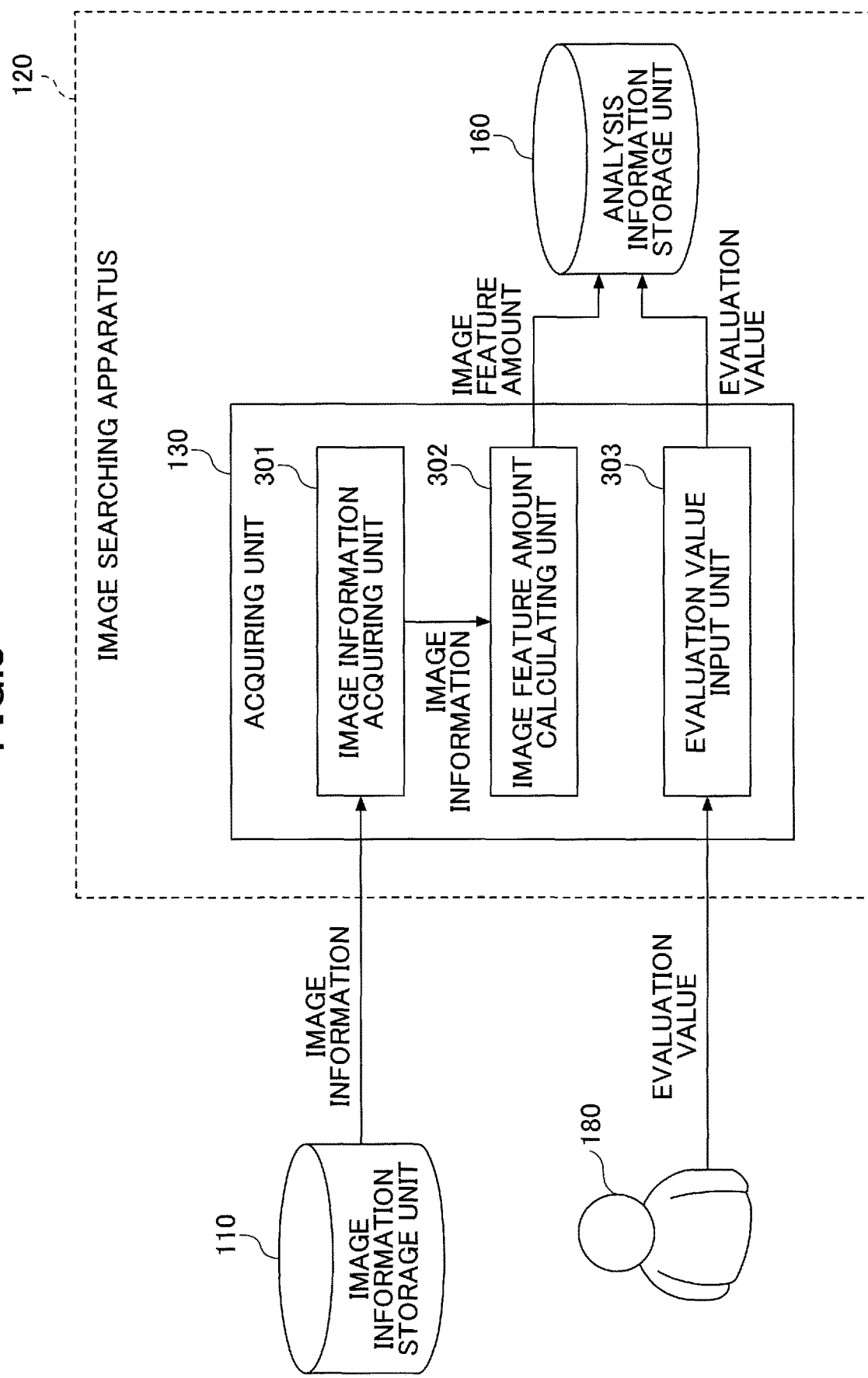
FIG. 3 is a diagram illustrating details of the functional configuration of an acquiring unit of the image searching apparatus according to the first embodiment of the present invention.

First, the function of the acquiring unit 130 of the image searching apparatus 120 will be described in detail. FIG. 3 is a diagram illustrating the functional configuration of the acquiring unit of the image searching apparatus according to the first embodiment in detail. As illustrated in FIG. 3, the acquiring unit 130 of the image searching apparatus 120 includes an image information acquiring unit 301, an image feature amount calculating unit 302, and an evaluation value input unit 303.

The image information acquiring unit 301 acquires image information from the image information storage unit 110 stored in an external device. Furthermore, the image information acquiring unit 301 reports, to the image feature amount calculating unit 302, the acquired image information.

The image feature amount calculating unit 302 calculates the image feature amount for each article image included in the image information, and stores the image feature amount in the analysis information storage unit 160.

The evaluation value input unit 303 accepts an evaluation value for a qualitative index (an index indicating an impression of an article) of each article image included in the image information, input by the administrator 180 managing the image information. Furthermore, the evaluation value input unit 303 stores the input evaluation value in association with each article image, in the analysis information storage unit 160.

(2) Description of Image Feature Amount

Next, the image feature amount calculated by the image feature amount calculating unit 302 will be described. FIG. 4 is a diagram illustrating an example of the image feature amount. As illustrated in FIG. 4, an image feature amount 400 includes, as information items, "article ID", "article image", "feature amount A", "feature amount B", "feature amount C", . . . , "feature amount X".

"Article ID" and "article image" are information items included in the image information acquired by the image information acquiring unit 301, and an identifier for identifying the article and an image of the article are respectively stored in these information items.

In "feature amount A", "feature amount B", "feature amount C", . . . "feature amount X", the image feature amounts of the corresponding article images calculated by the image feature amount calculating unit 302, are stored. Specifically, a color histogram, a Local Binary Pattern (LBP) image feature amount, a Scale-Invariant Feature Transform (SIFT) image feature amount, and a Histogram of Oriented Gradient (HOG) image feature amount, etc., can be cited.

In the example of FIG. 4, with respect to the article identified by the article ID="ID001", the value of the feature amount A is "A1", the value of the feature amount B is "B1", the value of the feature amount C is "C1", and the value of the feature value X is "X1".

(3) Description of Evaluation Value

Next, the evaluation value input via the evaluation value input unit 303 will be described. FIG. 5 is a diagram illustrating an example of evaluation values. As illustrated in FIG. 5, an evaluation value 500 includes, as information items, "article ID", "article image", and "index".

"Article ID" and "article image" are information items included in the image information acquired by the image information acquiring unit 301, and an identifier for identifying the article and an image of the article are respectively stored in these information items. Furthermore, in "index", a qualitative index (index indicating the impression of the article) about the corresponding article image and the evaluation value thereof, are stored.

In the case of FIG. 5, there are qualitative indices for an article image, as follows.

An index indicating whether the article image gives a "subdued" impression or a "flashy" impression (first index).

An index indicating whether the article image gives an "artificial" impression or a "natural" impression (second index).

An index indicating whether the article image gives a "plain" impression or a "rich" impression (third index).

An index indicating whether the article image gives a "heavy" impression or a "light" impression (fourth index).

Note that for each index, an evaluation value input by the administrator 180 managing the image information, is stored.

Note that the administrator 180 who manages the image information himself/herself may make an evaluation and input an evaluation value for each index, or the administrator 180 who manages the image information may input an evaluation result given by another person. For example, an evaluation value may be determined by giving a questionnaire to a large number of users on a website. Alternatively, an evaluation value may be determined by giving a questionnaire to particular users (for example, users in their twenties, or users having an attribute close to the customer, etc.). Accordingly, the reliability of the evaluation value can be increased.

(4) Description of Analysis Information

Next, the analysis information stored in the analysis information storage unit 160 will be described. FIG. 6 is a diagram illustrating an example of analysis information. As illustrated in FIG. 6, analysis information 600 is information in which the image feature amount 400 and the evaluation value 500 are associated with each other. Therefore, the analysis information 600 includes, as information items, "article ID", "article image", "feature amount A", "feature amount B", "feature amount C", . . . "feature amount X", and "index". Note that the information stored in each information item has already been described with reference to FIGS. 4 and 5, and, therefore, descriptions thereof will be omitted here.

<3.2 Details of Function of Generating Unit—First Embodiment>

(1) Details of Functional Configuration of Generating Unit

Next, the function of the generating unit 140 of the image searching apparatus 120 will be described in detail. FIG. 7 is a diagram illustrating the functional configuration of the generating unit of the image searching apparatus according to the first embodiment in detail. As illustrated in FIG. 7, the generating unit 140 of the image searching apparatus 120 includes a plotting unit 701 and an evaluation value area generating unit 702.

The plotting unit 701 reads the analysis information 600 stored in the analysis information storage unit 160 and plots the image feature amounts of the respective article images, in a feature amount space formed of the respective feature amounts ("feature amount A", "feature amount B", "feature amount C", . . . "feature amount X"). Furthermore, the plotting unit 701 reports, to the evaluation value area generating unit 702, the plotting result that is plotted in the feature amount space.

The evaluation value area generating unit 702 classifies together the plotting results having the same evaluation value, for each index, with respect to the plotting results obtained by plotting the image feature amounts of the respective article images in the feature amount space. Accordingly, plural evaluation value areas for each index are generated in the feature amount space.

Furthermore, the evaluation value area generating unit 702 stores the generated evaluation value area in the area information storage unit 170.

(2) Specific Example of Process By Generating Unit

Figure 8A:
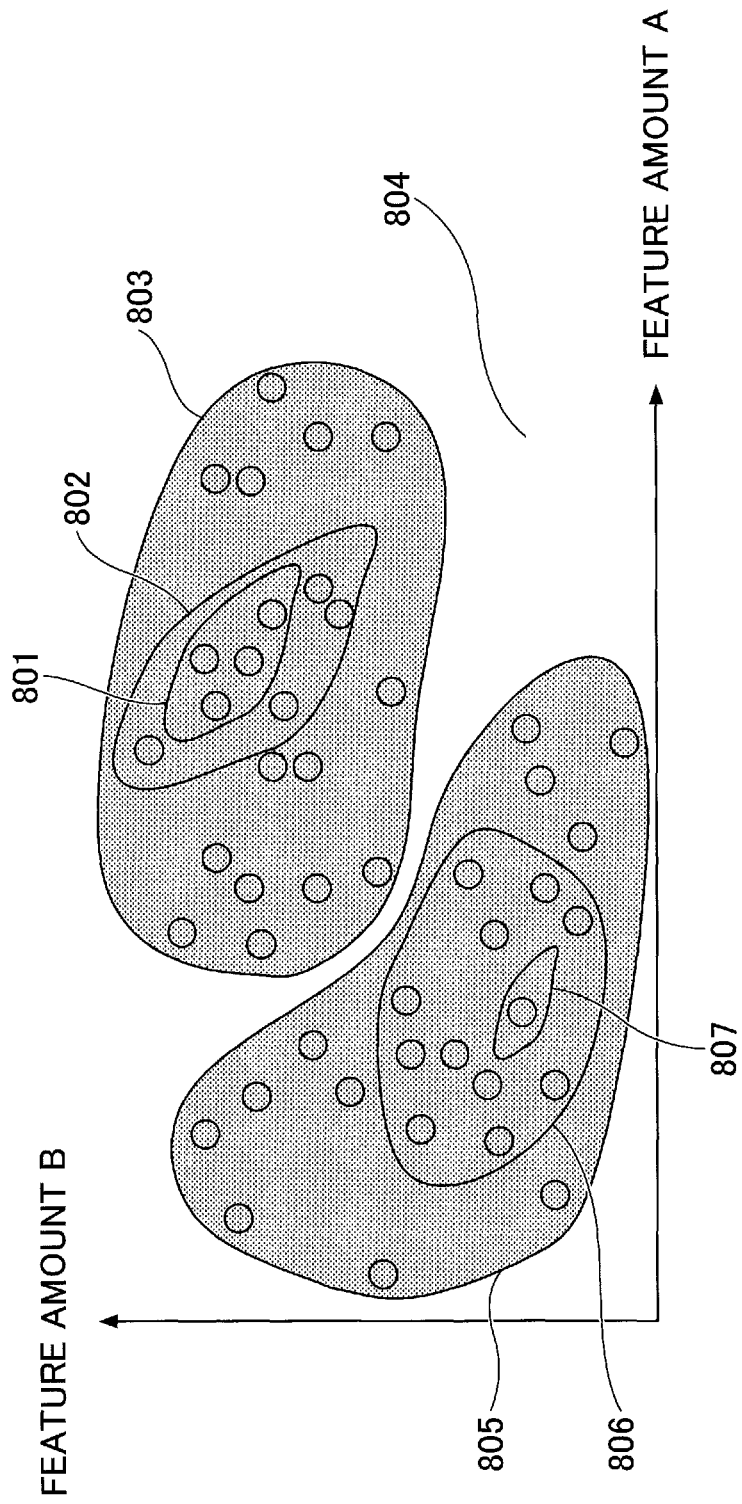

Next, a specific example of the process of generating and storing the evaluation value area by the generating unit 140 will be described. FIGS. 8A to 8C are diagrams illustrating a plurality of evaluation value areas for each index. Note that in the example of FIGS. 8A to 8C, the feature amount space is a two-dimensional feature amount space including a feature amount A and a feature amount B in order to simplify the description. FIGS. 8A to 8C respectively illustrate the evaluation value areas of the first index to the third index, in a two-dimensional feature amount space.

Specifically, in FIG. 8A, small circles indicate the image feature amounts (values of "feature amount A" and "feature amount B") of each article image, plotted in a two-dimensional feature amount space. Furthermore, in FIG. 8A, an evaluation value area 801 is an area including the image feature amounts of article images whose evaluation value for the first index is "+3". Furthermore, an evaluation value area 802 is an area including the image feature amounts of article images whose evaluation value for the first index is "+2". An evaluation value area 803 is an area including the image feature amounts of article images whose evaluation value for the first index is "+1".

Furthermore, an evaluation value area 804 is an area including the image feature amounts of article images whose evaluation value for the first index is "±0". Evaluation value areas 805 to 807 are areas including the image feature amounts of article images whose evaluation values of the first index are "−1", "−2", and "−3", respectively.

Similarly, in FIG. 8B, small circles indicate the image feature amounts (values of "feature amount A" and "feature amount B") of each article image, plotted in a two-dimensional feature amount space. Furthermore, in FIG. 8B, an evaluation value area 811 is an area including the image feature amounts of article images whose evaluation value for the second index is "+3". Furthermore, an evaluation value area 812 is an area including the image feature amounts of article images whose evaluation value for the second index is "+2". An evaluation value area 813 is an area including the image feature amounts of article images whose evaluation value for the second index is "+1".

Furthermore, an evaluation value area 814 is an area including the image feature amounts of article images whose evaluation value for the second index is "±0". Evaluation value areas 815 to 817 are areas including the image feature amounts of article images whose evaluation values of the second index are "−1", "−2", and "−3", respectively.

Similarly, in FIG. 8C, small circles indicate the image feature amounts (values of "feature amount A" and "feature amount B") of each article image, plotted in a two-dimensional feature amount space. Furthermore, in FIG. 8C, an evaluation value area 821 is an area including the image feature amounts of article images whose evaluation value for the third index is "+3". Furthermore, an evaluation value area 822 is an area including the image feature amounts of article images whose evaluation value for the third index is "+2". An evaluation value area 823 is an area including the image feature amounts of article images whose evaluation value for the third index is "+1".

Furthermore, an evaluation value area 824 is an area including the image feature amounts of article images whose evaluation value for the third index is "±0". Evaluation value areas 825 to 827 are areas including the image feature amounts of article images whose evaluation values of the third index are "−1", "−2", and "−3", respectively.

The generating unit 140 stores the evaluation value areas 801 to 807, the evaluation value areas 811 to 817, and the evaluation value areas 821 to 827, etc., generated for each index, in the area information storage unit 170, in association with the corresponding index.

<3.3 Details of Functions of Identifying Unit—First Embodiment>

(1) Details of the Functional Configuration of Identifying Unit

Figure 9:
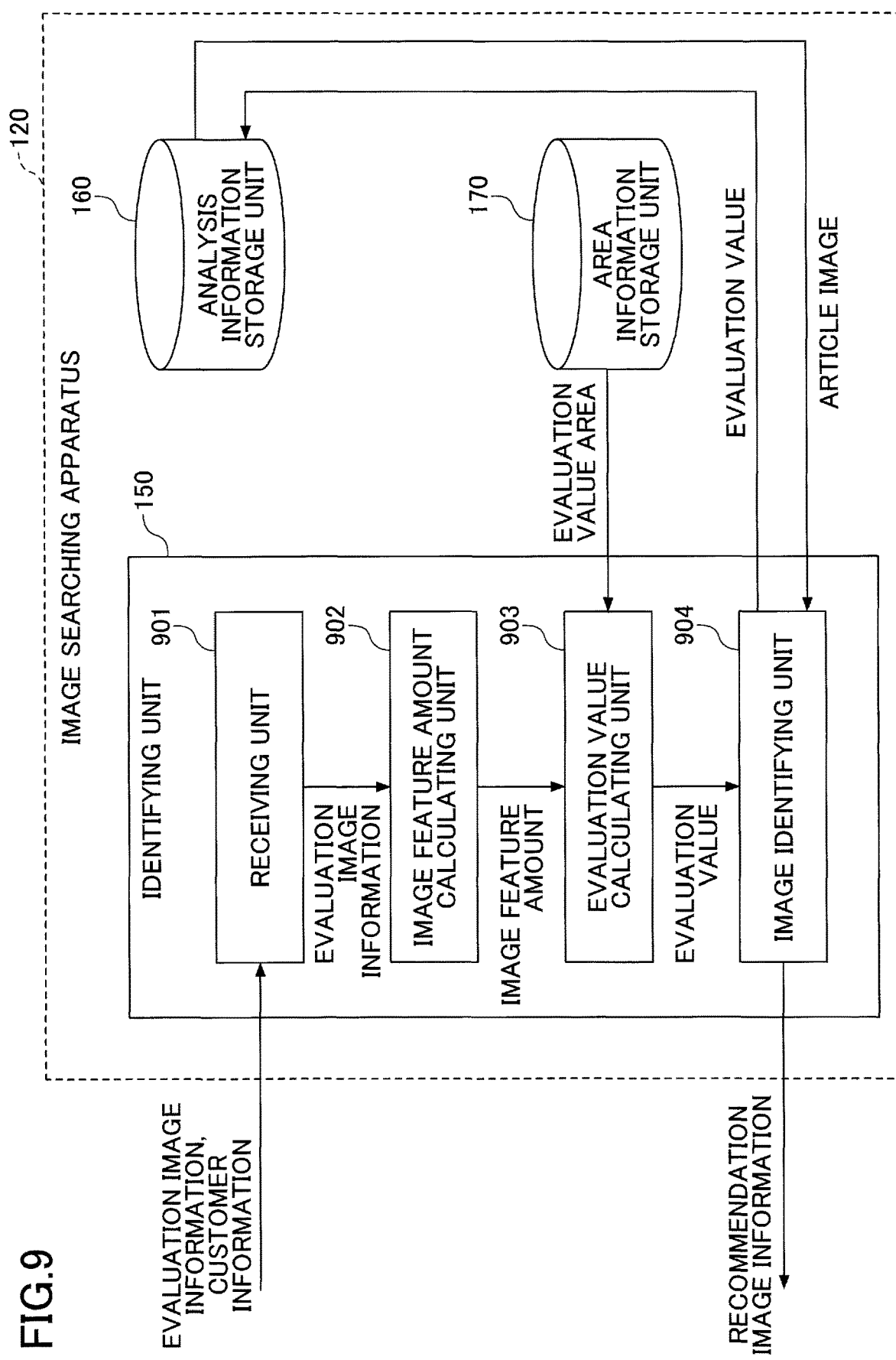
FIG. 9 is a diagram illustrating details of the functional configuration of an identifying unit of the image searching apparatus according to the first embodiment of the present invention.

Next, the function of the identifying unit 150 of the image searching apparatus 120 will be described in detail. FIG. 9 is a diagram illustrating the details of the functional configuration of the identifying unit of the image searching apparatus according to the first embodiment. As illustrated in FIG. 9, the identifying unit 150 of the image searching apparatus 120 includes a receiving unit 901, an image feature amount calculating unit 902, an evaluation value calculating unit 903, and an image identifying unit 904.

The receiving unit 901 is an example of a receiving unit. The receiving unit 901 receives evaluation image information including an image in which the preference of a customer is expressed, and the customer information, from an external device, and reports the received information to the image feature amount calculating unit 902.

The image feature amount calculating unit 902 calculates the image feature amount of an image included in the evaluation image information. Furthermore, the image feature amount calculating unit 902 reports the calculated image feature amount to the evaluation value calculating unit 903.

The evaluation value calculating unit 903 is an example of a calculating unit. The evaluation value calculating unit 903 reads the evaluation value area of each index stored in the area information storage unit 170 and compares the evaluation value area with a calculated image feature amount, to calculate an evaluation value for each index. Accordingly, the evaluation value calculating unit 903 can calculate an evaluation value indicating the customer's preference, based on the image included in the evaluation image information. Furthermore, the evaluation value calculating unit 903 reports the calculated image evaluation value for each index to the image identifying unit 904.

The image identifying unit 904 is an example of a identifying unit. The image identifying unit 904 refers to the analysis information 600 stored in the analysis information storage unit 160 and identifies an article image having the same or similar evaluation value as the calculated evaluation value for each index. Furthermore, the image identifying unit 904 also functions as an output unit or a print control unit, and outputs the identified article image as recommendation image information, to an external device (for example, a terminal or a printing device, etc.). Thus, for example, in the case of functioning as a print control unit, it is possible to produce a printed material including the identified article image.

(2) Specific Example of Process by Evaluation Value Calculating Unit

Figure 10A:
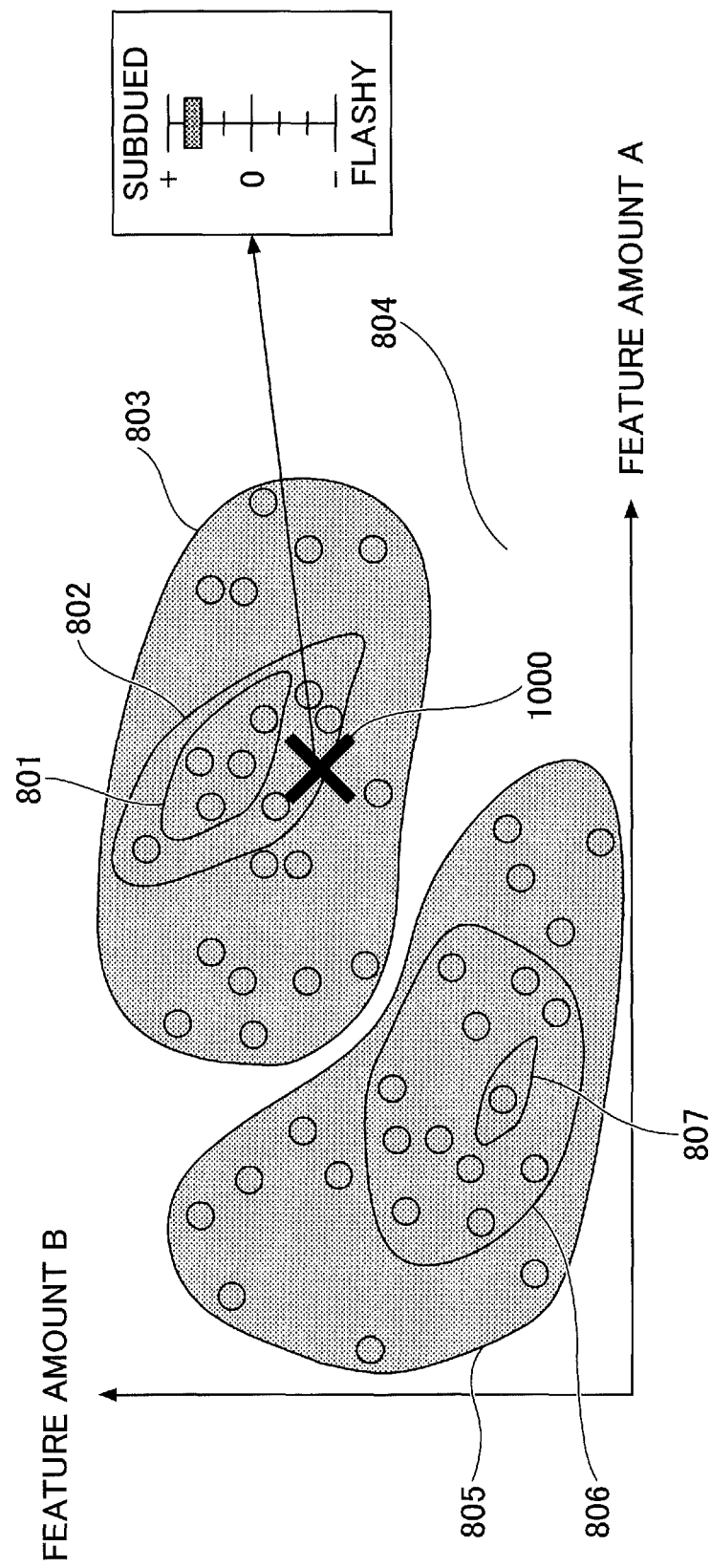
FIGS. 10A to 10C are diagrams illustrating a specific example of a process of the evaluation value calculating unit according to the first embodiment of the present invention.
Figure 10B:
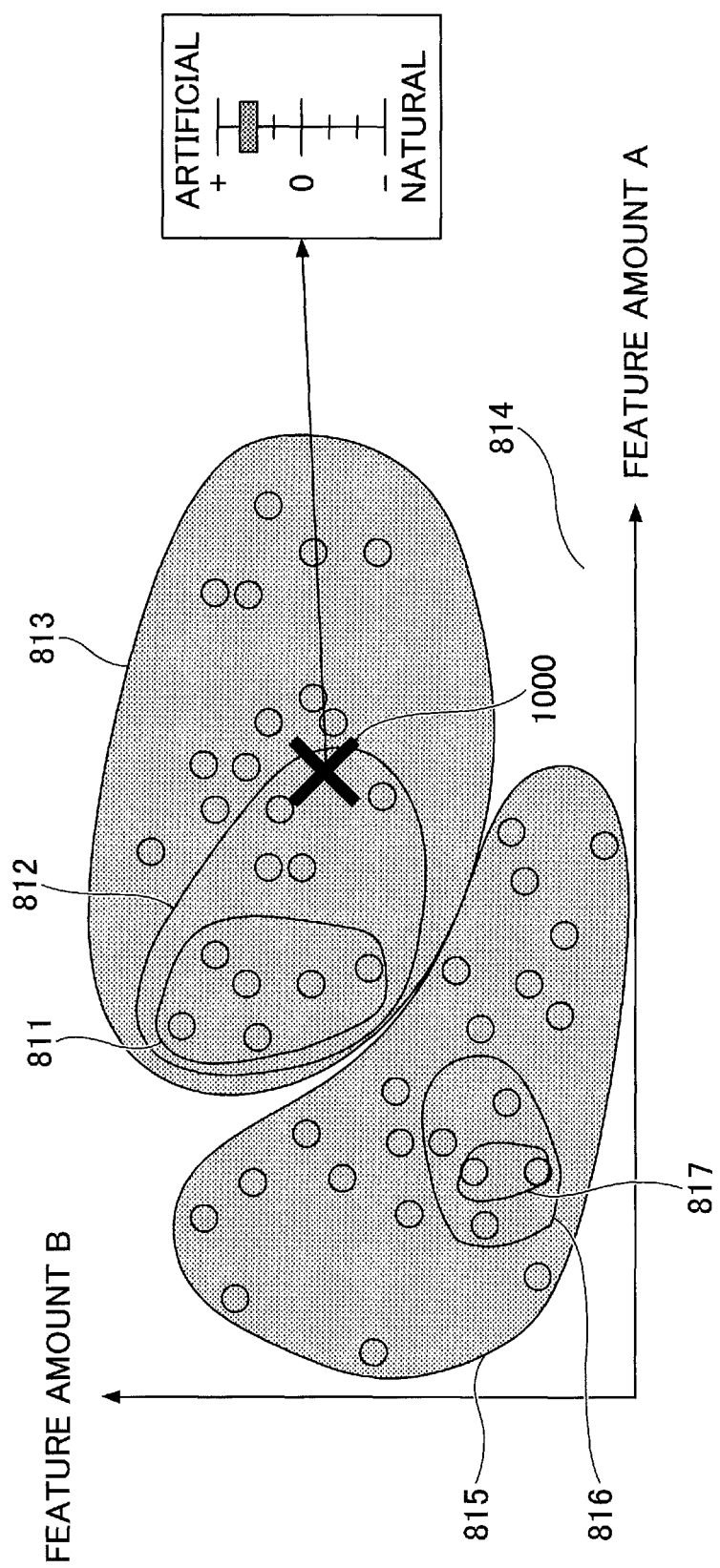
Figure 10C:
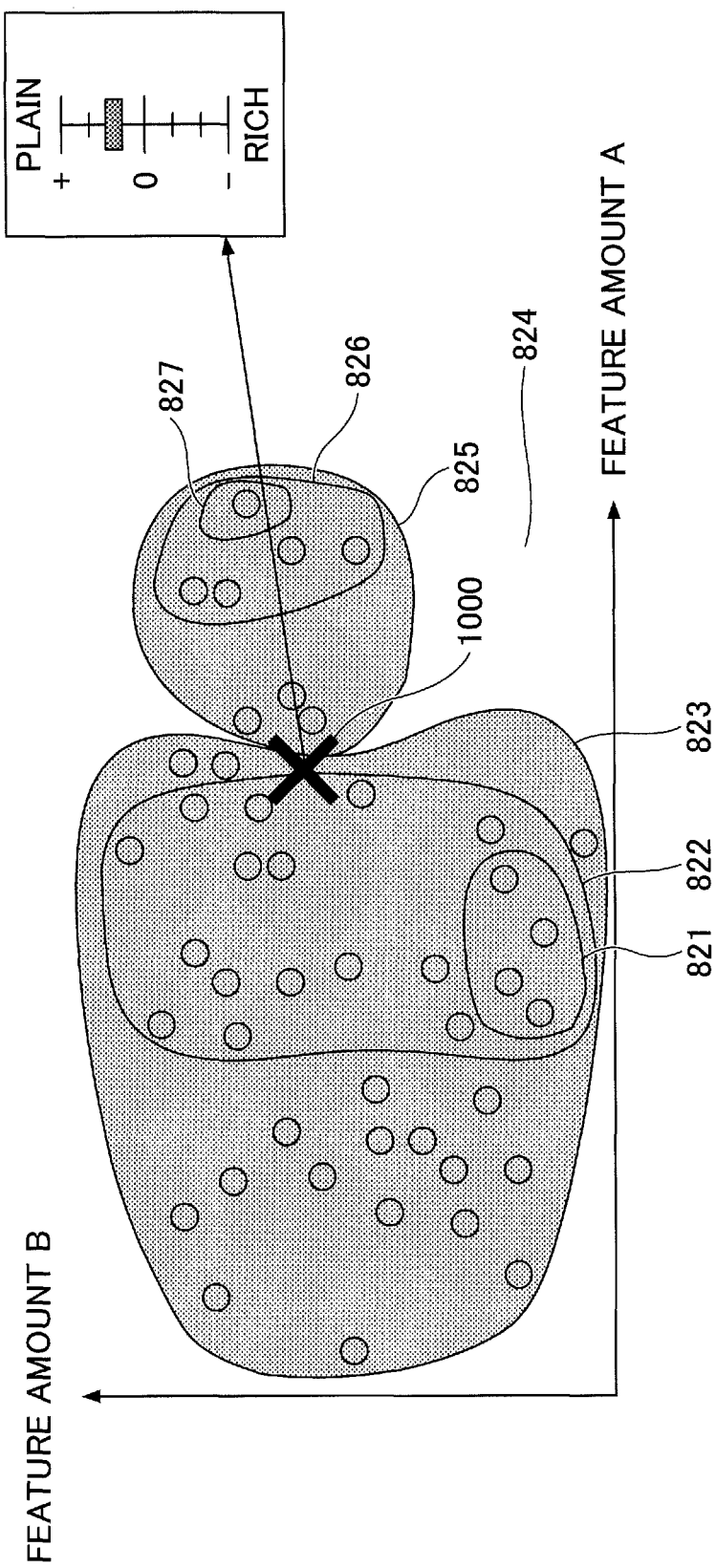

Next, a specific example of a process, in which the evaluation value calculating unit 903 of the identifying unit 150 calculates an evaluation value indicating the customer's preference, will be described. FIGS. 10A to 10C are diagrams illustrating a specific example of the process of the evaluation value calculating unit. In FIGS. 10A to 10C, the evaluation value areas 801 to 807, 811 to 817, and 821 to 827 are the evaluation value areas of the first to third indices read from the area information storage unit 170, respectively.

Furthermore, in FIGS. 10A to 10C, a cross mark 1000 indicates a position where the image feature amount of the image included in the evaluation image information is plotted. According to the example of FIG. 10A, the evaluation value for the first index of the image included in the evaluation image information is calculated as "+2". Furthermore, according to the example of FIG. 10B, the evaluation value for the second index of the image included in the evaluation image information is calculated as "+2". Furthermore, according to the example of FIG. 10C, the evaluation value for the third index of the image included in the evaluation image information is calculated as "+1".

<4. Flow of Image Searching Process By Image Searching Apparatus—First Embodiment>

Figure 11:
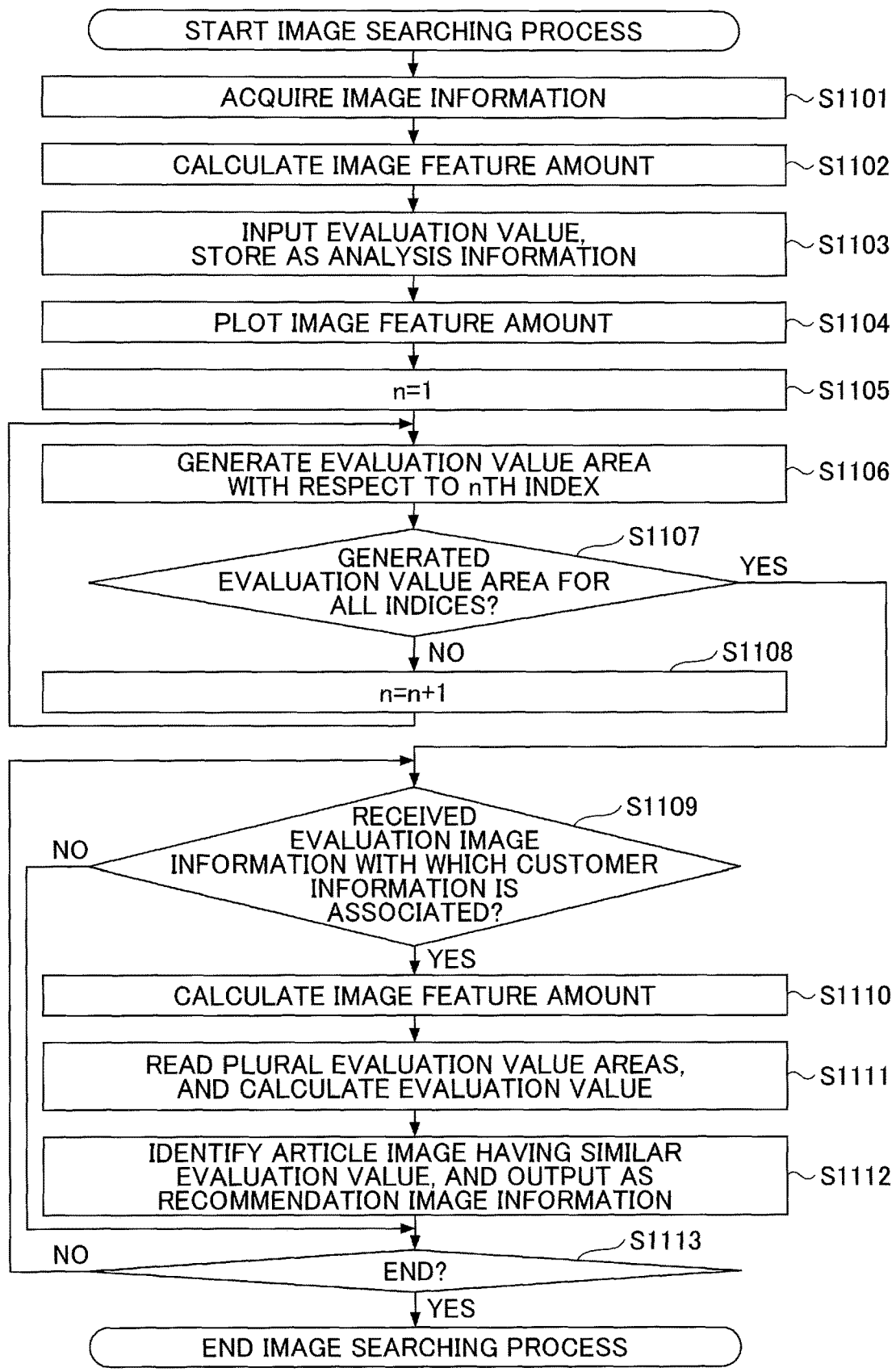
FIG. 11 is a flowchart illustrating the flow of an image searching process by the image searching apparatus according to the first embodiment of the present invention.

Next, the flow of the image searching process by the image searching apparatus 120 will be described. FIG. 11 is a flowchart illustrating the flow of the image searching process by the image searching apparatus according to the first embodiment.

In step S1101, the image information acquiring unit 301 acquires image information from the image information storage unit 110 stored in an external device. In step S1102, the image feature amount calculating unit 302 calculates an image feature amount for each article image included in the image information, and stores the image feature amount in the analysis information storage unit 160.

In step S1103, the evaluation value input unit 303 accepts an evaluation value for a qualitative index with respect to each article image included in the image information, input by the administrator 180 managing the image information. Furthermore, the evaluation value input unit 303 stores the input evaluation value in association with each article image, in the analysis information storage unit 160, as analysis information 600.

In step S1104, the plotting unit 701 reads the analysis information 600 stored in the analysis information storage unit 160, and plots the image feature amount of each article image in the feature amount space formed of feature amounts.

In step S1105, the evaluation value area generating unit 702 assigns 1 in a counter n that counts the index.

In step S1106, the evaluation value area generating unit 702 classifies together the plotting results having the same evaluation value, for the nth index, with respect to the plotting results plotted in the feature amount space. Accordingly, an evaluation value area of the nth index is generated in the feature amount space.

In step S1107, the evaluation value area generating unit 702 determines whether an evaluation value area has been generated for all indices. When it is determined in step S1107 that there is an index for which an evaluation value area has not been generated (NO in step S1107), the process proceeds to step S1108. In step S1108, the evaluation value area generating unit 702 increments the counter n and then returns to step S1106.

On the other hand, when it is determined in step S1107 that an evaluation value area has been generated for all indices (YES in step S1107), the process proceeds to step S1109.

In step S1109, the receiving unit 901 determines whether the evaluation image information including an image in which the preference of the customer is expressed and the customer information, are received from an external device. When it is determined in step S1109 that evaluation image information and customer information have not been received (NO in step S1109), the process proceeds to step S1113.

On the other hand, when it is determined in step S1109 that the evaluation image information and the customer information have been received (YES in step S1109), the process proceeds to step S1110.

In step S1110, the image feature amount calculating unit 902 calculates the image feature amount of the image included in the evaluation image information.

In step S1111, the evaluation value calculating unit 903 reads the plurality of evaluation value areas stored in the area information storage unit 170, and compares the image included in the evaluation image information with the calculated image feature amount, whereby the evaluation value for each index is calculated.

In step S1112, the image identifying unit 904 refers to the analysis information 600 stored in the analysis information storage unit 160, and identifies an article image having the same or similar evaluation value as the calculated evaluation value for each index. Furthermore, the image identifying unit 904 outputs the identified article image as recommendation image information to an external device.

<5. Summary—First Embodiment>

As is apparent from the above description, the image searching apparatus 120 according to the first embodiment has the following functions.

- An evaluation value for each of a plurality of articles evaluated based on an index indicating the impression of the article, and an image feature amount of each article calculated based on the article image of the plurality of articles, are acquired, and are stored in the analysis information storage unit 160 as analysis information.
- By classifying together the image feature amounts of the respective articles having the same evaluation value, for each index, in the feature amount space, a plurality of evaluation value areas for each index is generated in the feature amount space.
- When evaluation image information including an image in which the customer's preference is expressed, is input, by calculating the image feature amount of the image included in the evaluation image information and comparing the image feature amount with the evaluation value area, the evaluation value for each index (evaluation value indicating customer's preference) is calculated.
- By referring to the analysis information, an article image having the same or similar evaluation value as the calculated evaluation value for each index, is identified, and the identified article image is output as recommendation image information.

Thus, according to the image searching apparatus 120 of the first embodiment, an evaluation value indicating the preference of the customer is calculated from an image selected by the customer, and based on the calculated evaluation value, recommendation image information can be output. As a result, it is possible to output recommendation image information corresponding to the preference of the customer.

As described above, according to the image searching apparatus 120 according to the first embodiment, it is possible to implement recommendations corresponding to the preference of the customer.

Second Embodiment

In the first embodiment, no particular reference was made to the method of searching for article images having the same or similar evaluation value as the calculated evaluation value for each index. In a second embodiment, as an example of a method of searching for an article image having the same or similar evaluation value as the calculated evaluation value for each index, a searching method using a radar chart will be described. Hereinafter, the second embodiment will be described focusing on differences from the first embodiment.

<1. Detailed Function of Identifying Unit—Second Embodiment>

Figure 12:
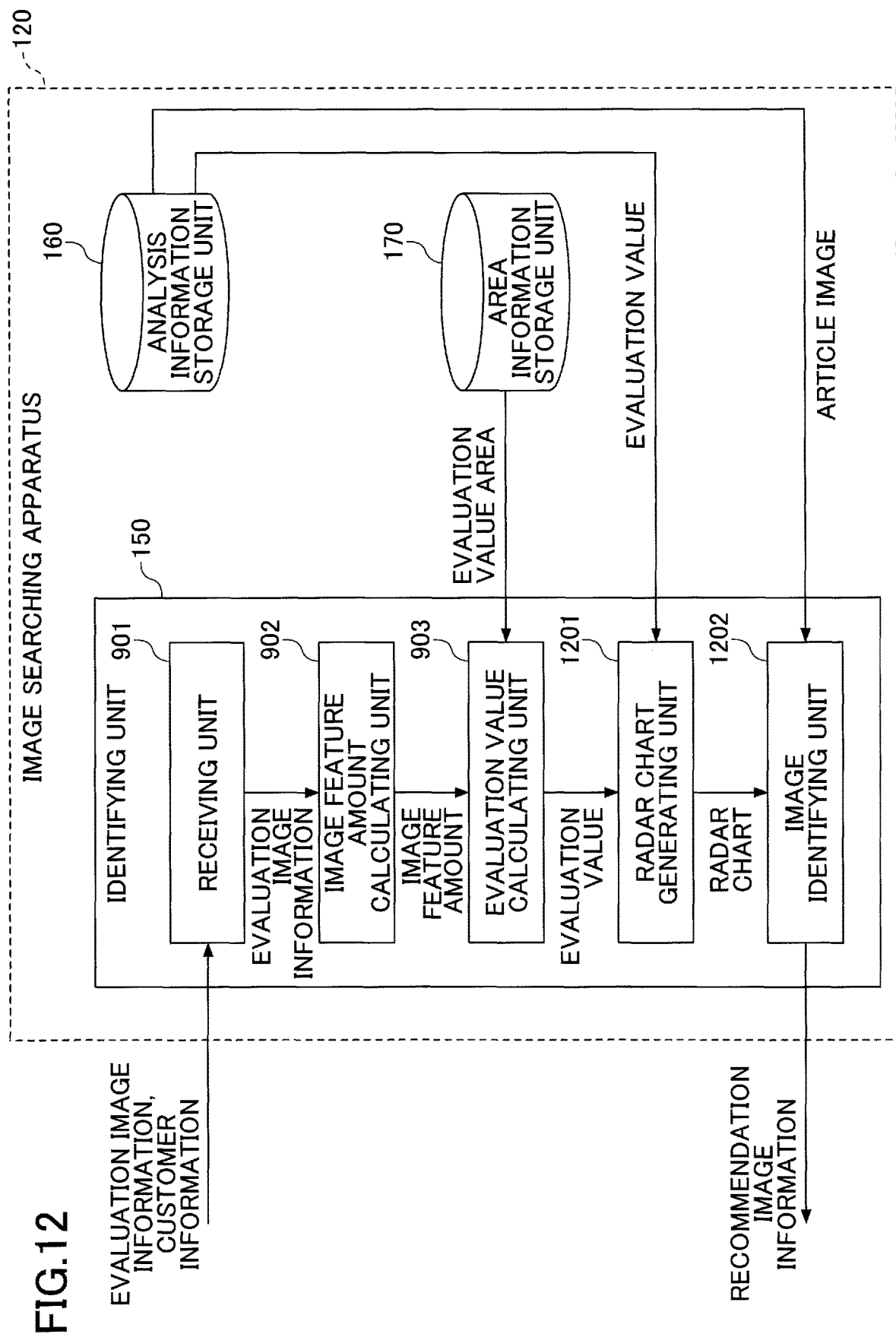
FIG. 12 is a diagram illustrating details of the functional configuration of an identifying unit of the image searching apparatus according to a second embodiment of the present invention.

First, the function of the identifying unit 150 of the image searching apparatus 120 according to the second embodiment will be described in detail. FIG. 12 is a diagram illustrating the details of the functional configuration of the identifying unit of the image searching apparatus according to the second embodiment. The difference from the functional configuration of the identifying unit 150 described with reference to FIG. 9 is a radar chart generating unit 1201 and an image identifying unit 1202.

When the radar chart generating unit 1201 acquires, from the evaluation value calculating unit 903, the evaluation value for each index with respect to an image included in evaluation image information, the radar chart generating unit 1201 connects the evaluation values for the respective indices by using each index as an axis, thereby generating a radar chart of evaluation values with respect to the image. Furthermore, the radar chart generating unit 1201 generates a radar chart of evaluation values for each article image, with respect to the analysis information 600 stored in the analysis information storage unit 160.

Furthermore, the radar chart generating unit 1201 reports, to the image identifying unit 1202, a radar chart of the evaluation values of an image included in evaluation image information, and a radar chart of the evaluation values of each article image.

The image identifying unit 1202 compares the radar chart of the evaluation values of the image included in the evaluation image information with the radar charts of the evaluation values of the respective article images, and identifies the radar chart having the same or similar shape. Furthermore, the image identifying unit 1202 reads the article image corresponding to the identified radar chart, from the analysis information storage unit 160, and outputs the article image as recommendation image information to an external device.

Figure 13:
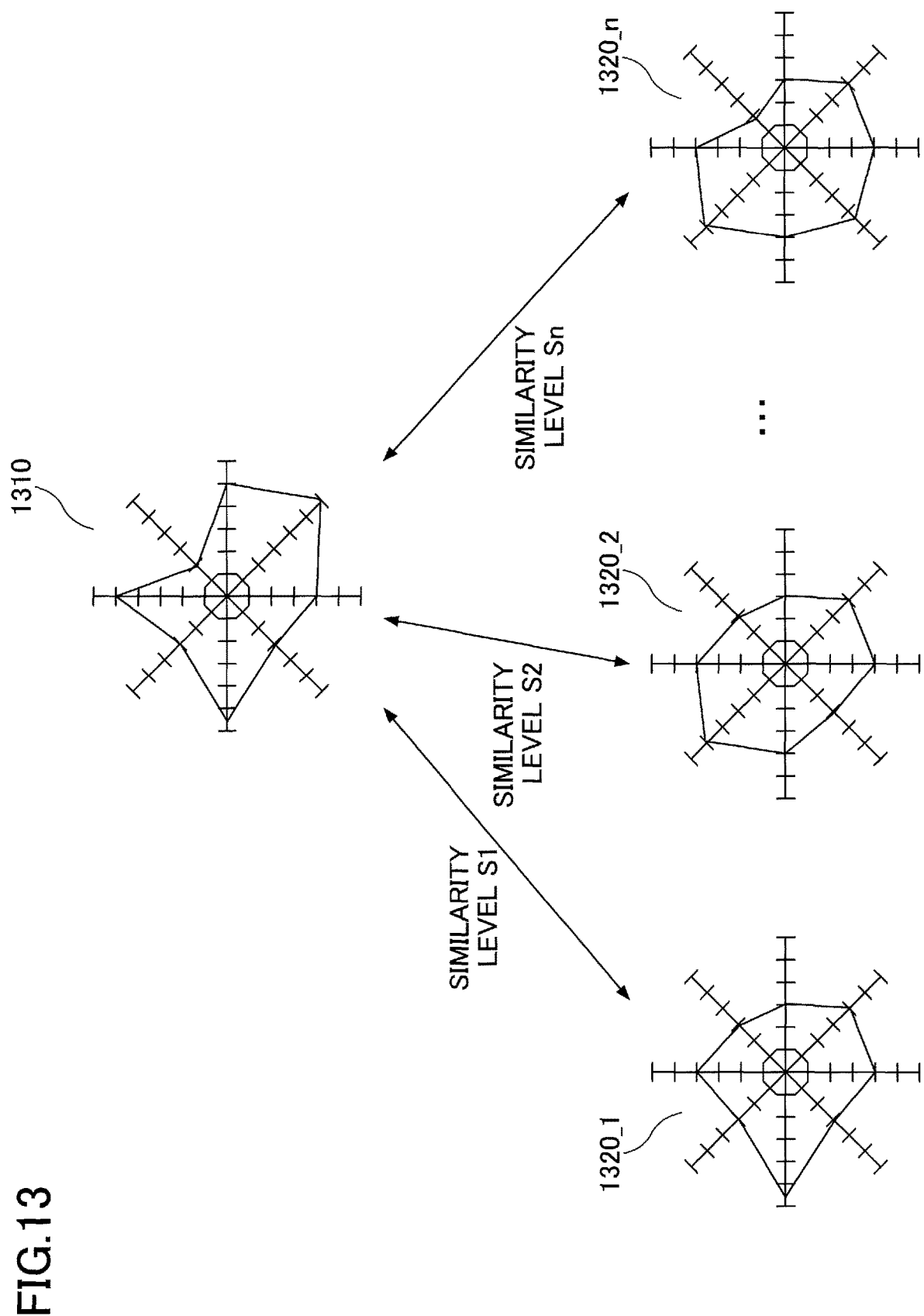
FIG. 13 is a diagram illustrating a specific example of processes of a radar chart generating unit and an image identifying unit according to the second embodiment of the present invention.

FIG. 13 is a diagram illustrating a specific example of the process by the radar chart generating unit and the image identifying unit. In FIG. 13, a radar chart 1310 is a radar chart of evaluation values of an image included in the evaluation image information generated by the radar chart generation unit 1201. Furthermore, the radar charts 1320_1 to 1320_n are radar charts of evaluation values for each article image generated by the radar chart generating unit 1201.

The image identifying unit 1202 calculates the similarity degrees S1, S2, . . . Sn in shape between the radar chart 1310 and the radar charts 1320_1 to 1320_n. Then, the image identifying unit 1202 outputs, as recommendation image information, the article image corresponding to the radar chart whose calculated similarity degree is greater than or equal to a predetermined threshold value. Alternatively, the image identifying unit 1202 outputs, as the recommendation image information, the article images corresponding to the radar charts whose calculated similarity degree ranks within the top m similarity degrees.

<2. Flow of Image Searching Process by Image Searching Apparatus—Second Embodiment>

Figure 14:
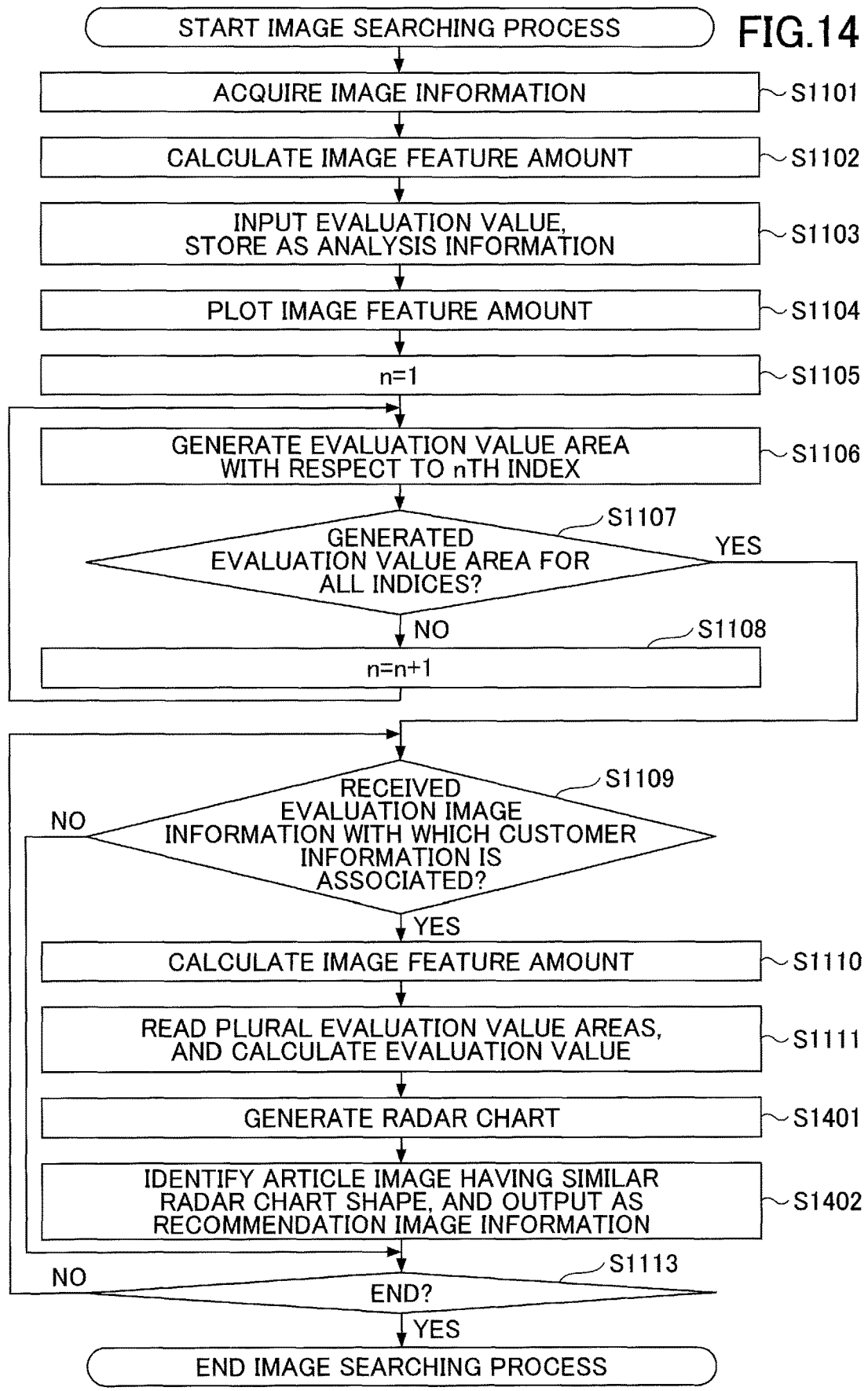
FIG. 14 is a flowchart illustrating the flow of an image searching processing by the image searching apparatus according to the second embodiment of the present invention.

Next, the flow of the image searching process by the image searching apparatus 120 according to the second embodiment will be described. FIG. 14 is a flowchart illustrating the flow of an image searching process by the image searching apparatus according to the second embodiment. The differences from the image searching process illustrated in FIG. 11 are step S1401 and step S1402. The radar chart generating unit 1201 acquires, from the evaluation value calculating unit 903, the evaluation values for the respective indices with respect to the image included in the evaluation image information, and generates a radar chart (step S1401). Furthermore, the radar chart generating unit 1201 generates a radar chart of evaluation values for each article image with respect to the analysis information 600 stored in the analysis information storage unit 160.

In step S1402, the image identifying unit 1202 compares the radar chart of the evaluation values of the image included in the evaluation image information, with the radar chart of the evaluation values of each article image, and identifies a radar chart having the same or similar shape. Furthermore, the image identifying unit 1202 reads the article image corresponding to the identified radar chart from the analysis information storage unit 160, and outputs the article image as recommendation image information to an external device.

<3. Summary—Second Embodiment>

As is apparent from the above description, the image searching apparatus according to the second embodiment has the same function as the image searching apparatus according to the first embodiment, and additionally uses a radar chart to identify article images having the same or similar evaluation value for each index.

Thus, according to the image searching apparatus according to the second embodiment, it is possible to achieve the same effects as those of the first embodiment and to output more appropriate recommendation image information.

Third Embodiment

In a third embodiment, a case where the image searching apparatus 120 according to the first and second embodiments is applied to a purchasing system will be described. The purchasing system referred to here means a system that provides a service of selling products via the Internet, etc. (a system that provides, for example, a so-called mail-order website).

<1. System Configuration of Purchasing System—Third Embodiment>

Figure 15:
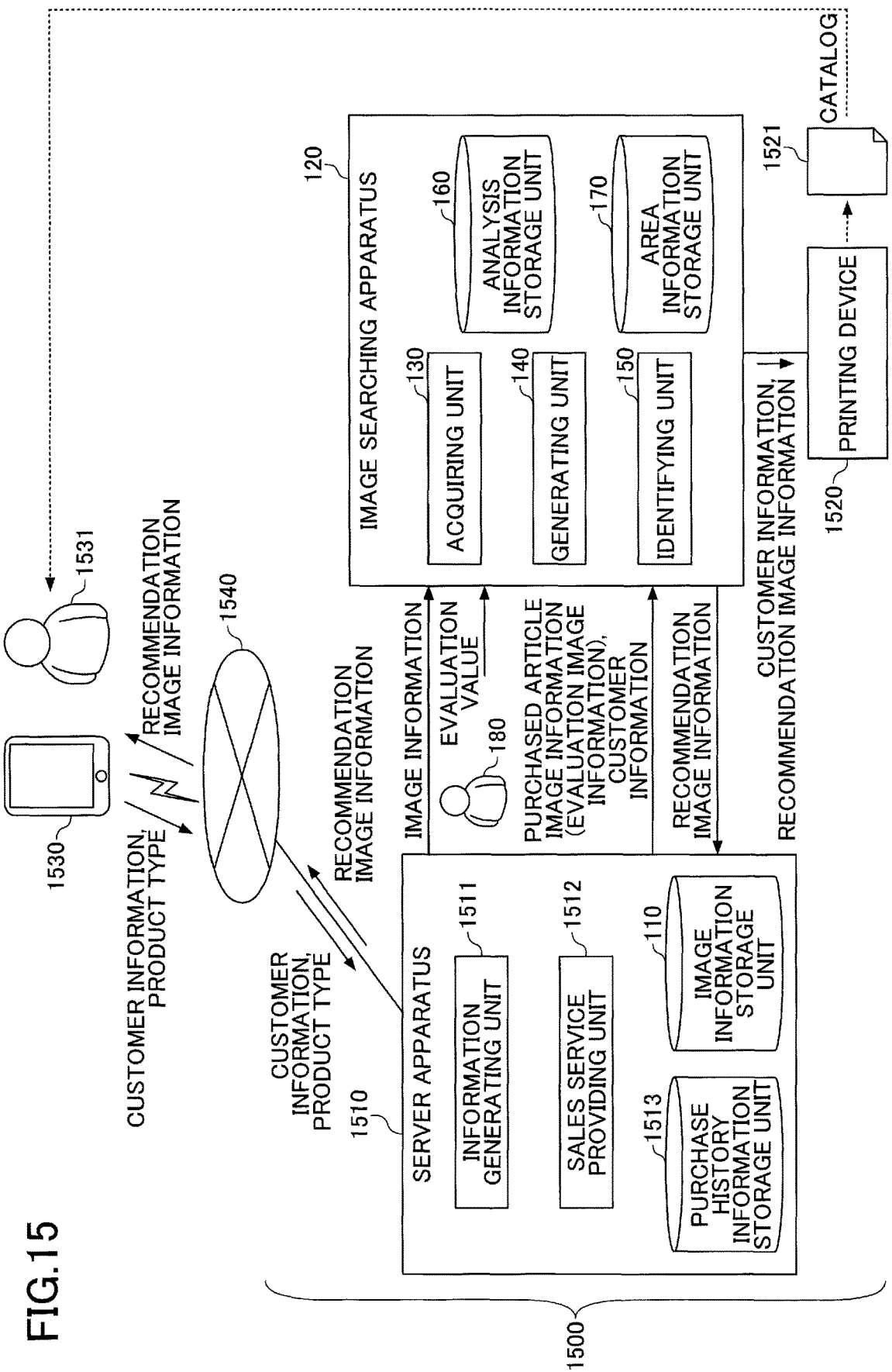
FIG. 15 is a first diagram illustrating an example of the image searching apparatus according to the first and second embodiments being applied to a purchasing system according to a third embodiment of the present invention.

First, a system configuration of a purchasing system to which the image searching apparatus 120 according to the first and second embodiments is applied, will be described. FIG. 15 is a first diagram illustrating an example of applying the image searching apparatus according to the first and second embodiments, to a purchasing system.

As illustrated in FIG. 15, a purchasing system 1500 includes a server apparatus 1510 and is connected to the image searching apparatus 120. The server apparatus 1510 has a service providing program installed therein, and by executing the program, the server apparatus 1510 functions as an information generating unit 1511 and a sales service providing unit 1512.

The information generating unit 1511 transmits, from the image information storage unit 110, image information including the article images of all articles (products) that can be sold, to the image searching apparatus 120. Note that with respect to all articles that can be sold included in the image information transmitted by the information generating unit 1511, the image searching apparatus 120 accepts an evaluation value for each index input by the administrator 180 of the article images.

FIG. 16 is a diagram illustrating an example of image information in the purchasing system. As illustrated in FIG. 16, image information 1600, which is transmitted to the image searching apparatus 120 in the purchasing system 1500, includes the information items of "product category", "product ID", "size", "color", "price", and "article image", etc.

In the "product category", information indicating the type of the product is stored, and in the "product ID", an identifier for identifying the product is stored. In "size", "color", and "price", pieces of information indicating the size, color, and price of the product are stored respectively. Furthermore, in the "article image", an image of the product identified by the product ID, is stored.

Returning to the description of FIG. 15, in FIG. 15, the sales service providing unit 1512 provides a product sales service. Specifically, when there is access from a terminal 1530 via a network 1540, the sales service providing unit 1512 transmits a screen for providing a product sales service to the terminal 1530.

Furthermore, when customer information and information indicating the product type is transmitted from a customer 1531 (user of the terminal 1530) in response to the transmission of the screen, the sales service providing unit 1512 accepts this information. Furthermore, the sales service providing unit 1512 searches a purchase history information storage unit 1513 based on the accepted customer information and the information indicating the product type, and acquires purchased article image information including an article image of a product that the customer has purchased in the past (an image in which the customer's preference is expressed). Furthermore, the sales service providing unit 1512 transmits the acquired purchased article image information, as evaluation image information, to the image searching apparatus 120, together with customer information and information indicating the product type.

FIG. 17 is a diagram illustrating an example of purchase history information in the purchasing system. As illustrated in FIG. 17, in the purchasing system 1500, purchase history information 1700 is managed for each piece of customer information.

Furthermore, as illustrated in FIG. 17, the purchase history information 1700 includes the information items of "purchase date and time", "product ID", "product category", "size", "color", "purchased quantity", "price", and "purchased article image".

In "purchase date and time", information indicating the date and time when the customer 1531 purchased the corresponding product, is stored. In the "product ID", an identifier for identifying the product is stored. Furthermore, in "product category", "size", "color", "purchased quantity", and "price", pieces of information indicating the type, size, color, quantity, and price of the product are respectively stored. Furthermore, in the "purchased article image", an image of the product identified by the product ID, that is an image of a product purchased by the customer 1531 in the past, is stored.

Returning to FIG. 15 again, the image searching apparatus 120 transmits recommendation image information in response to the sales service providing unit 1512 transmitting the purchased article image information, and, therefore, the sales service providing unit 1512 receives this recommendation image information. Furthermore, the sales service providing unit 1512 transmits the received recommendation image information to the terminal 1530.

Accordingly, the customer 1531 can view article images having the same or similar evaluation values as the evaluation values indicating the preference of the customer 1531, calculated based on the past purchase history of the customer 1531. That is, according to the purchasing system 1500, it is possible to implement recommendations corresponding to the preference of the customer. As a result, the possibility that the customer 1531 can efficiently purchase products, etc., corresponding to the preference of the customer 1531, will increase.

Note that the purchasing system 1500 further includes a printing device 1520, and the image searching apparatus 120 outputs recommendation image information to the printing device 1520, together with customer information. Accordingly, the printing device 1520 can create a printed material (a catalog 1521) including recommendation image information. Furthermore, the administrator 180 of the image information can deliver the created catalog 1521 to a destination identified by customer information.

Accordingly, the customer 1531 can obtain a catalog illustrating articles having the same or similar evaluation values as the evaluation values indicating the preference of the customer 1531, calculated based on the purchase history of the customer 1531. That is, according to the purchasing system 1500, it is possible to implement recommendations corresponding to the preference of the customer. As a result, the possibility that the customer 1531 can efficiently purchase products, etc., corresponding to the preference of the customer 1531, will increase.

<2. Flow of Recommendation Image Information Output Process by in Purchasing System—Third Embodiment>

Figure 18:
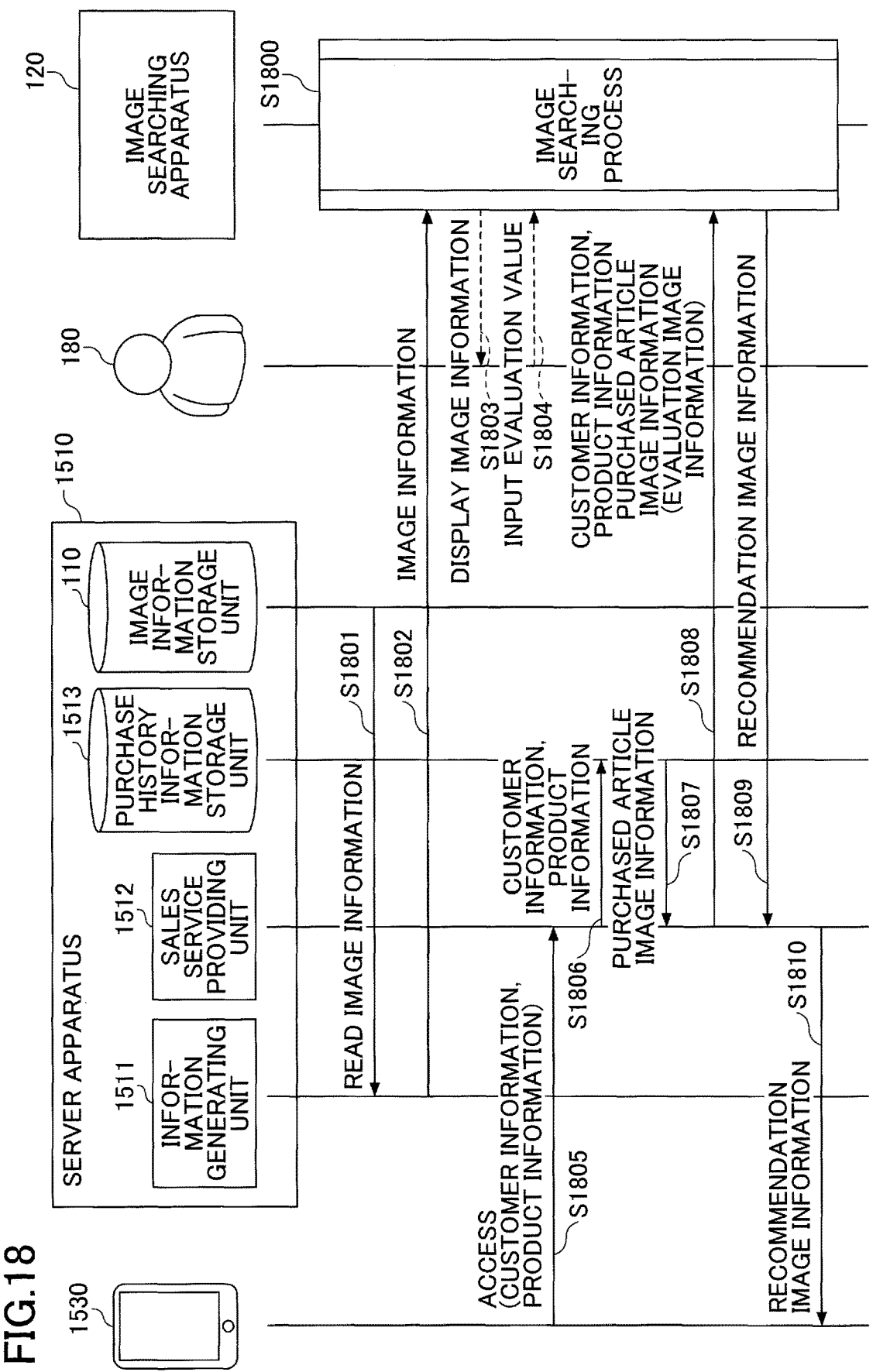
FIG. 18 is a first sequence diagram illustrating the flow of a recommendation image information output process in a purchasing system according to the third embodiment of the present invention.

Next, the flow of the recommendation image information output process in the purchasing system 1500 will be described. FIG. 18 is a first sequence diagram illustrating the flow of a recommendation image information output process in the purchasing system.

In step S1800, the image searching apparatus 120 executes the image searching process (see FIG. 11 or FIG. 14).

In step S1801, the information generating unit 1511 of the server apparatus 1510 reads the image information 1600 from the image information storage unit 110.

In step S1802, the information generating unit 1511 of the server apparatus 1510 transmits the read image information 1600 to the image searching apparatus 120.

In step S1803, the image searching apparatus 120 displays the article image included in the image information 1600, to the administrator 180 of the image information 1600.

In step S1804, the administrator 180 inputs the evaluation value for each index with respect to each article image that is displayed.

In step S1805, when there is access from the terminal 1530, the sales service providing unit 1512 transmits a screen for providing the product sales service to the terminal 1530. Furthermore, when customer information and information indicating the product type is transmitted from the terminal 1530 in response to the screen being transmitted from the sales service providing unit 1512, the sales service providing unit 1512 receives this information.

In step S1806, the sales service providing unit 1512 searches the purchase history information storage unit 1513 based on the received customer information and information indicating the product type.

In step S1807, the sales service providing unit 1512 acquires purchased article image information including an article image of a product that the customer has purchased in the past.

In step S1808, the sales service providing unit 1512 transmits the purchased article image information as evaluation image information, to the image searching apparatus 120, together with the customer information and the information indicating the product type. Note that in the present embodiment, it is assumed that the image searching apparatus 120 performs an image searching process according to information indicating the product type.

In step S1809, the sales service providing unit 1512 receives the recommendation image information from the image searching apparatus 120. In step S1810, the sales service providing unit 1512 transmits the recommendation image information to the terminal 1530.

<3. Summary—Third Embodiment>

As is apparent from the above description, the purchasing system 1500 to which the image searching apparatus 120 is applied, has the following functions.

When providing a sales service, the customer's purchase history information is transmitted as evaluation image information, to the image searching apparatus 120.

The recommendation image information transmitted from the image searching apparatus, according to the transmitted evaluation image information, is transmitted to the terminal receiving the sales service.

Accordingly, the customer can view or obtain a catalog illustrating article images or articles having the same or similar evaluation values as the evaluation values indicating the preference of the customer, calculated based on the past purchase history of the customer. That is, according to the purchasing system 1500, it is possible to implement recommendations corresponding to the preference of the customer. As a result, the possibility that the customer can efficiently purchase products, etc., corresponding to the preference of the customer, will increase.

Fourth Embodiment

In the third embodiment described above, a case where the server apparatus acquires purchased article image information from the purchase history information based on customer information and information indicating the product type, and transmits the acquired information to the image searching apparatus 120 as evaluation image information, has been described. In a fourth embodiment, a captured image captured (photographed) by a customer is received from the terminal, and is transmitted to the image searching apparatus 120 as evaluation image information. Hereinafter, the fourth embodiment will be described focusing on differences from the third embodiment.

<1. System Configuration of Purchasing System—Fourth Embodiment>

Figure 19:
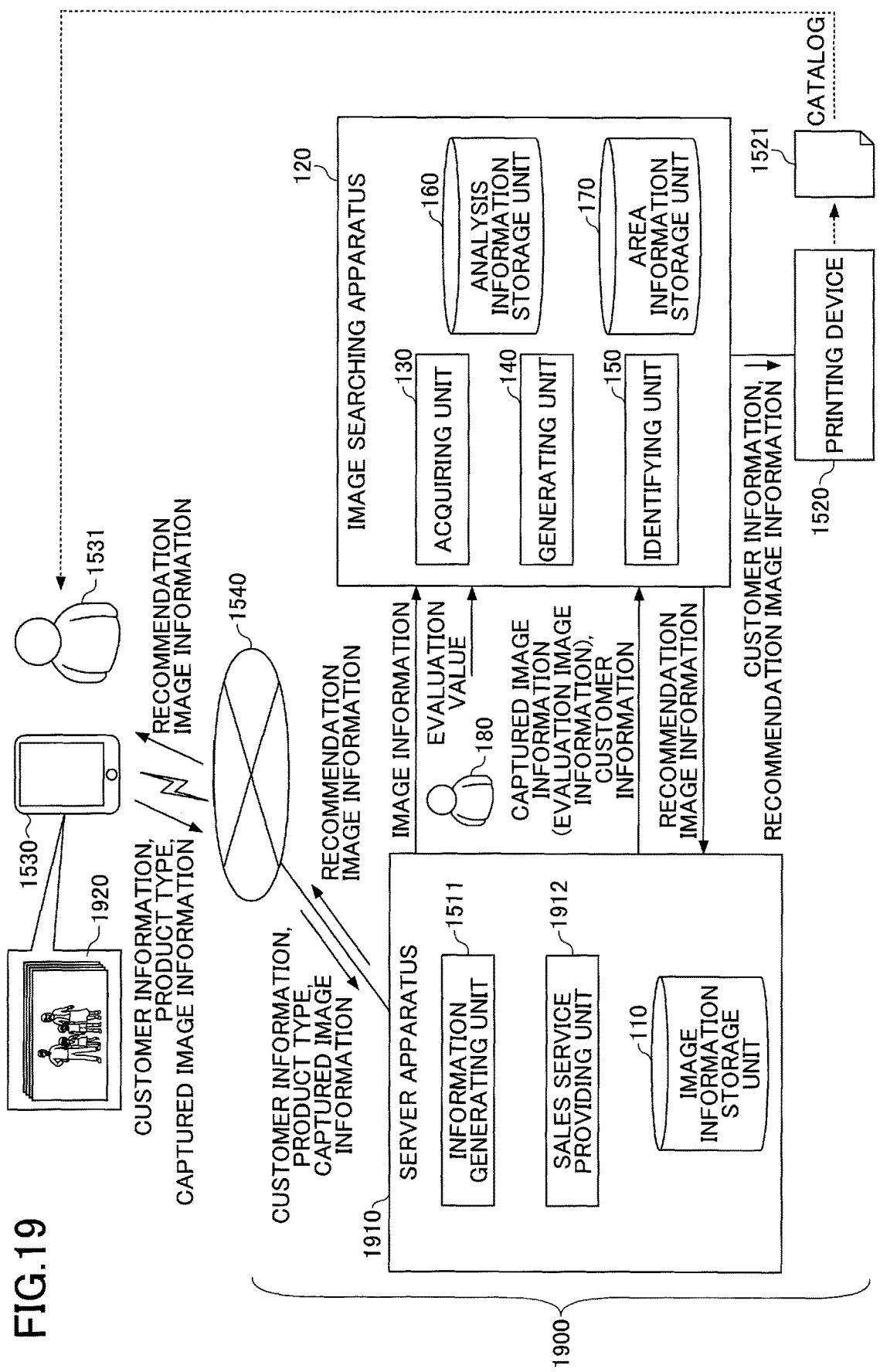
FIG. 19 is a second diagram illustrating an example of the image searching apparatus according to the first and second embodiments being applied to a purchasing system according to a fourth embodiment of the present invention.

FIG. 19 is a second diagram illustrating an example of applying the image searching apparatus according to the first and second embodiments to a purchasing system. As illustrated in FIG. 19, a purchasing system 1900 includes a server apparatus 1910 and is connected to the image searching apparatus 120. A service providing program is installed in the server apparatus 1910, and by executing the program, the server apparatus 1910 functions as the information generating unit 1511 and a sales service providing unit 1912.

Note that the function of the information generating unit 1511 has already been described in the third embodiment, and, therefore, the description thereof will be omitted here.

The sales service providing unit 1912 provides a sales service. Specifically, when there is access from the terminal 1530 via the network 1540, the sales service providing unit 1912 transmits a screen for providing a product sales service to the terminal 1530.

Furthermore, when customer information, information indicating the product type, and captured image information is transmitted from the customer 1531 (user of the terminal 1530) in response to the transmission of the screen, the sales service providing unit 1912 accepts this information. The captured image information means an image of the customer himself/herself wearing his/her favorite clothes (an image expressing the preference of the customer) selected by the customer 1531, from among captured images 1920 stored in the terminal 1530.

Furthermore, the sales service providing unit 1912 transmits the accepted captured image information as evaluation image information, to the image searching apparatus 120, together with customer information and information indicating the product type. The recommendation image information is transmitted from the image searching apparatus 120 in response to the sales service providing unit 1912 transmitting the captured image information, and, therefore, the sales service providing unit 1912 receives this recommendation image information. Furthermore, the sales service providing unit 1912 transmits the received recommendation image information to the terminal 1530.

Accordingly, the customer 1531 can view article images having the same or similar evaluation values as the evaluation values indicating the preference of the customer 1531, which is calculated based on the captured image. That is, according to the purchasing system 1900, it is possible to implement recommendations according to the preference of the customer. As a result, the possibility that the customer 1531 can efficiently purchase products, etc., corresponding to the preference of the customer 1531, will increase.

<2. Flow of Recommendation Image Information Output Process in Purchasing System—Fourth Embodiment>

Figure 20:
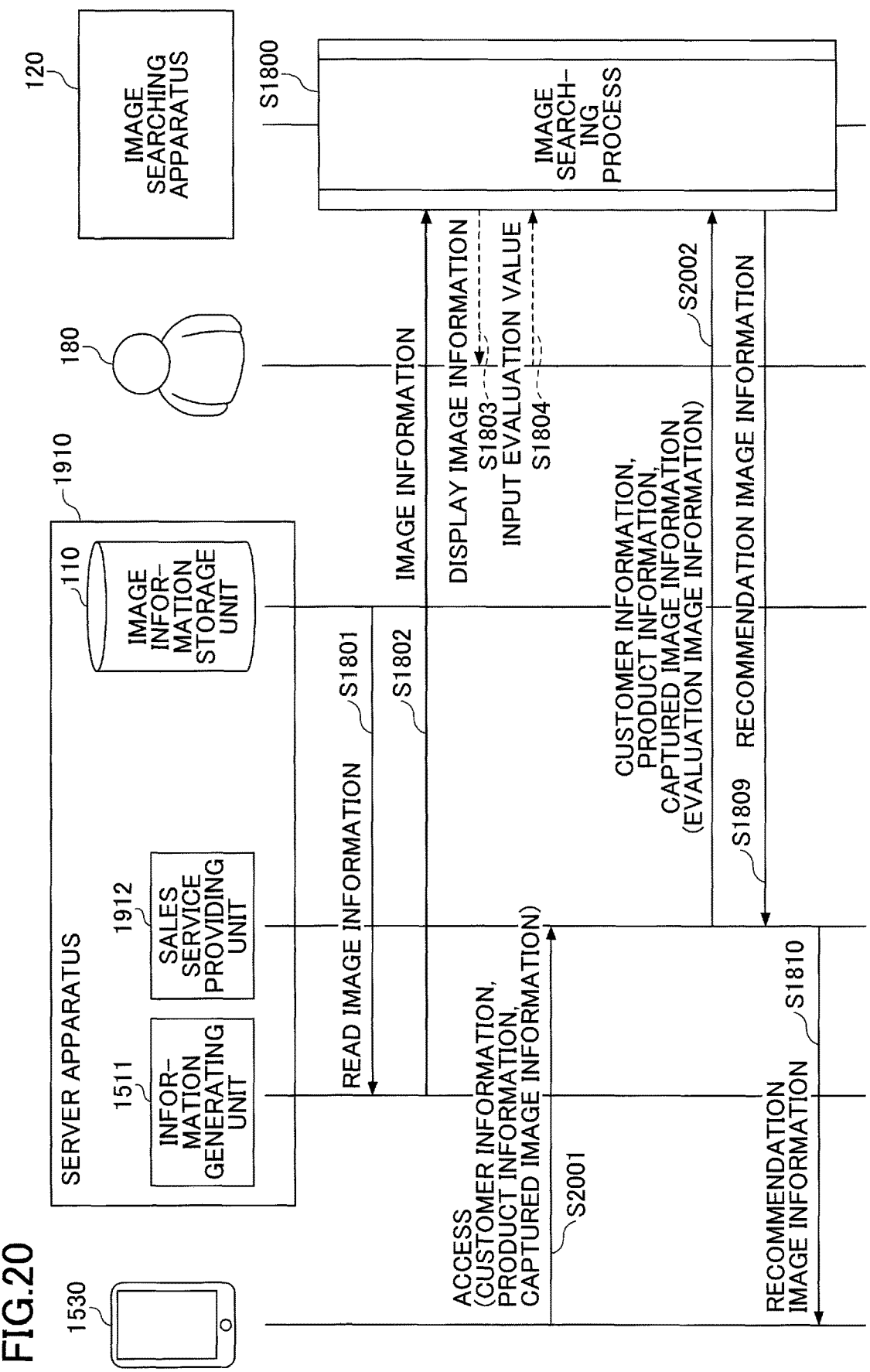
FIG. 20 is a second sequence diagram illustrating the flow of a recommendation image information output process in the purchasing system according to the fourth embodiment of the present invention.

Next, the flow of the recommendation image information output process in the purchasing system 1900 will be described. FIG. 20 is a second sequence diagram illustrating the flow of the recommendation image information output process in the purchasing system. The differences from the sequence diagram illustrated in FIG. 18 are step S2001 and step S2002.

In step S2001, when there is an access from the terminal 1530, the sales service providing unit 1912 transmits a screen for providing the product sales service, to the terminal 1530. Furthermore, when the customer information, the information indicating the product type, and the captured image information are transmitted in response to the sales service providing unit 1912 transmitting the screen, the sales service providing unit 1912 receives this information.

In step S2002, the sales service providing unit 1912 transmits the received captured image information as evaluation image information, to the image searching apparatus 120, together with the customer information and the information indicating the product type. Note that in the present embodiment, it is assumed that the image searching apparatus 120 performs an image searching process according to information indicating the product type.

<3. Summary—Fourth Embodiment>

As is apparent from the above description, the purchasing system 1900 to which the image searching apparatus 120 is applied, has the following functions.

When providing a sales service, captured image information of customer is transmitted as evaluation image information to the image searching apparatus 120.

In response to the transmitted evaluation image information, recommendation image information is transmitted from the image searching apparatus to the terminal receiving the sales service.

Accordingly, the customer can view article images having the same or similar evaluation values as the evaluation values indicating the preference of the customer, calculated based on the captured image. That is, according to the purchasing system 1900, it is possible to implement recommendations according to the preference of the customer. As a result, the possibility that the customer can efficiently purchase products, etc., corresponding to the preference of the customer, will increase.

Fifth Embodiment

In the first and second embodiments, a case where the identifying unit 150 of the image searching apparatus 120 acquires the evaluation image information and calculates the evaluation value for each index, has been described. On the other hand, in a fifth embodiment, a case where the identifying unit 150 of the image searching apparatus 120 directly accepts input of the evaluation value for each index, will be described.

<1. Detailed Function of Identifying Unit—Fifth Embodiment>

Figure 21:
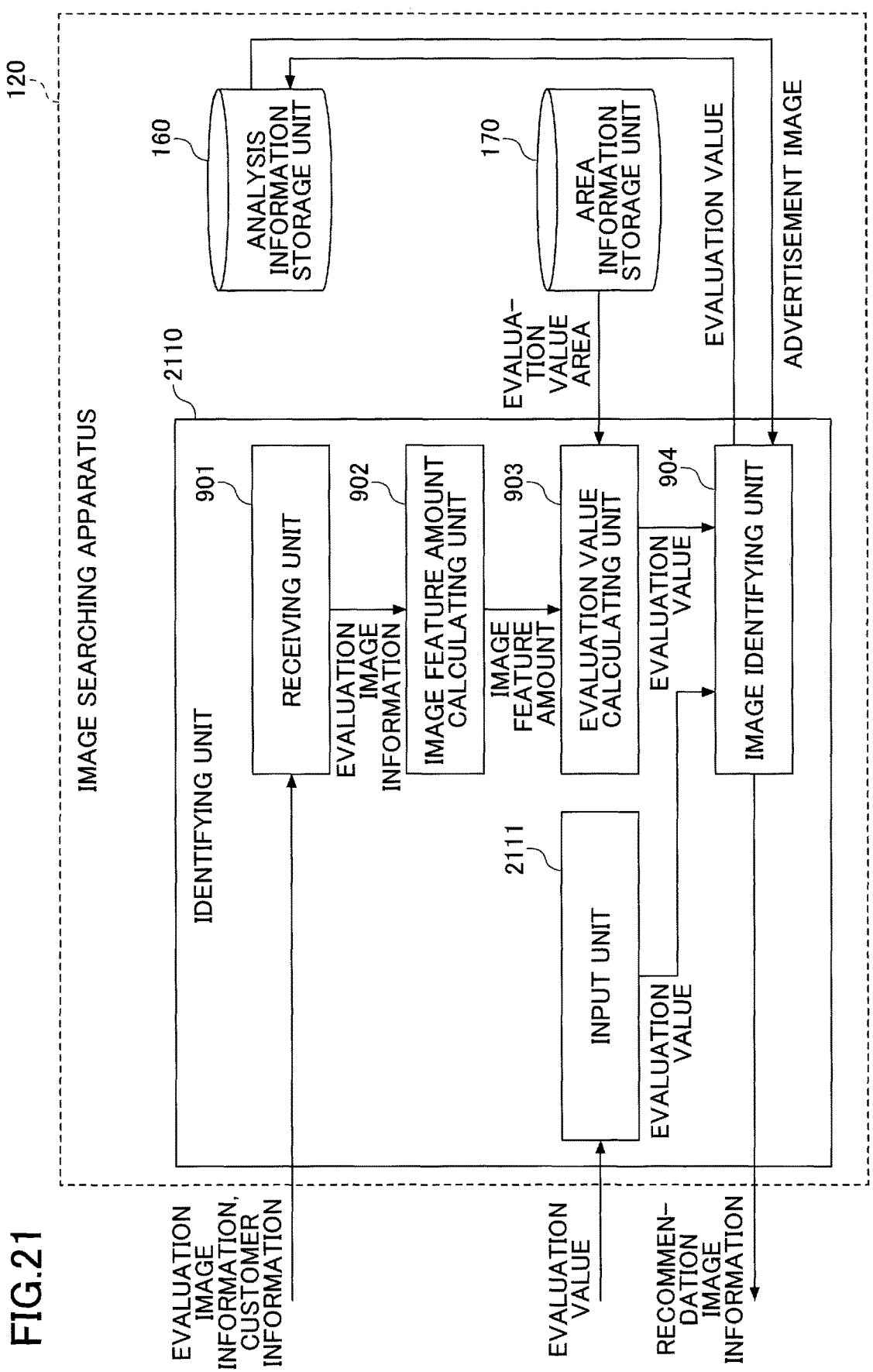
FIG. 21 is a diagram illustrating details of the functional configuration of an identifying unit of the image searching apparatus according to a fifth embodiment of the present invention.

FIG. 21 is a diagram illustrating the functional configuration of an identifying unit 2110 of the image searching apparatus according to the fifth embodiment in detail. The point that is different from the identifying unit 150 illustrated in FIG. 9 is that the identifying unit 2110 includes an input unit 2111.

Figure 22:
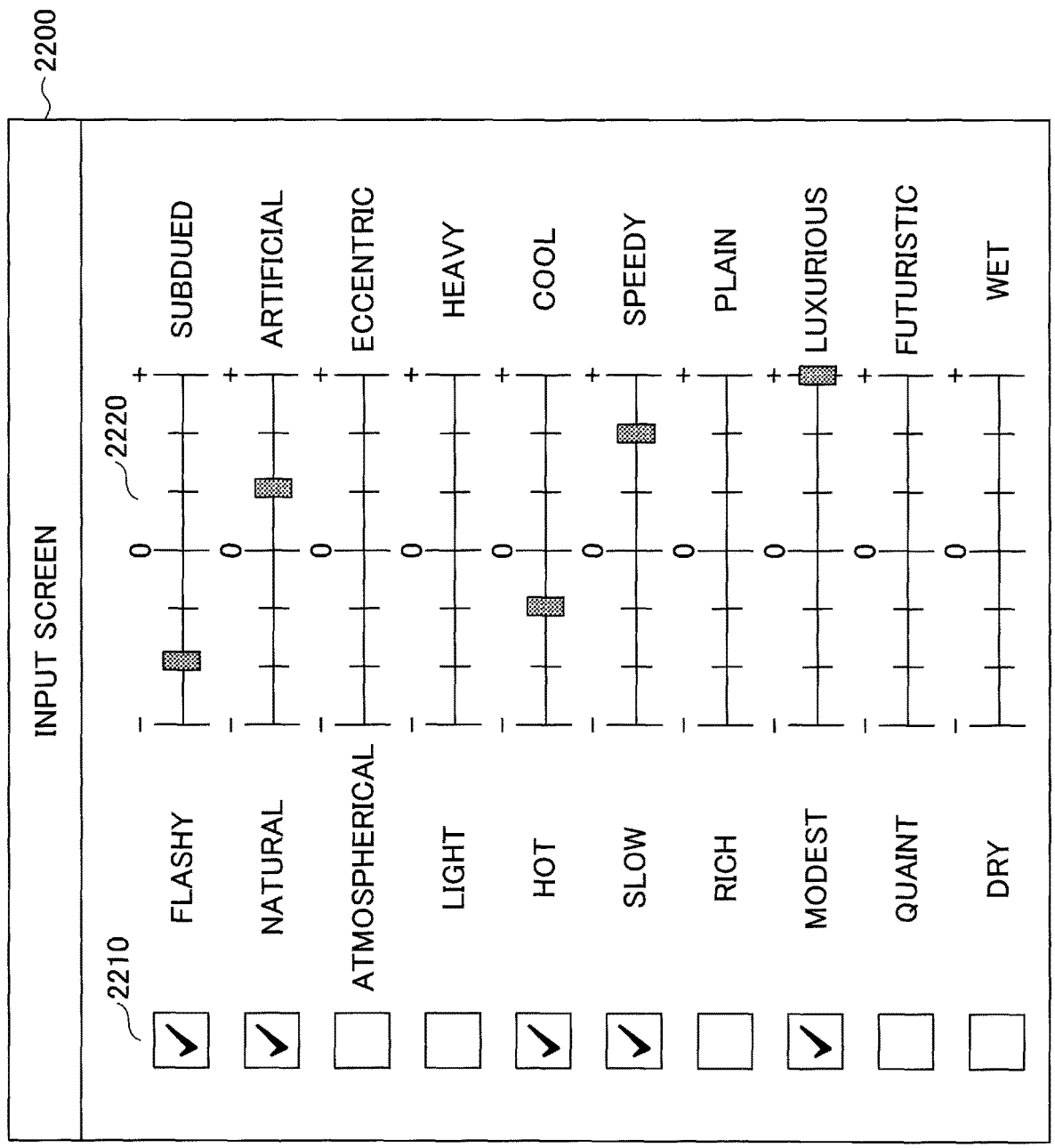
FIG. 22 is a diagram illustrating an example of an input screen for inputting an evaluation value for each index according to the fifth embodiment of the present invention.

The input unit 2111 is an example of an input unit and accepts an input of evaluation values for indices specified by a customer. Furthermore, the input unit 2111 reports, to the image identifying unit 904, the input evaluation value for each index. FIG. 22 is a diagram illustrating an example of an input screen for inputting an evaluation value for each index.

As illustrated in FIG. 22, on an input screen 2200 displayed by the input unit 2111, a tick box 2210 for instructing validation/invalidation of each index, and an input field 2220 for inputting the evaluation value for each index, are included.

The input unit 2111 reports, to the image identifying unit 904, the input evaluation value for the index for which the tick box 2210 is ticked. Accordingly, the image identifying unit 904 can identify, from the analysis information storage unit 160, an article image having the same or similar evaluation value as the input evaluation value for the ticked index, and output the identified article image as the recommendation image information.

<2. Flow of Image Searching Process by Image Searching Apparatus—Fifth Embodiment>

Figure 23:
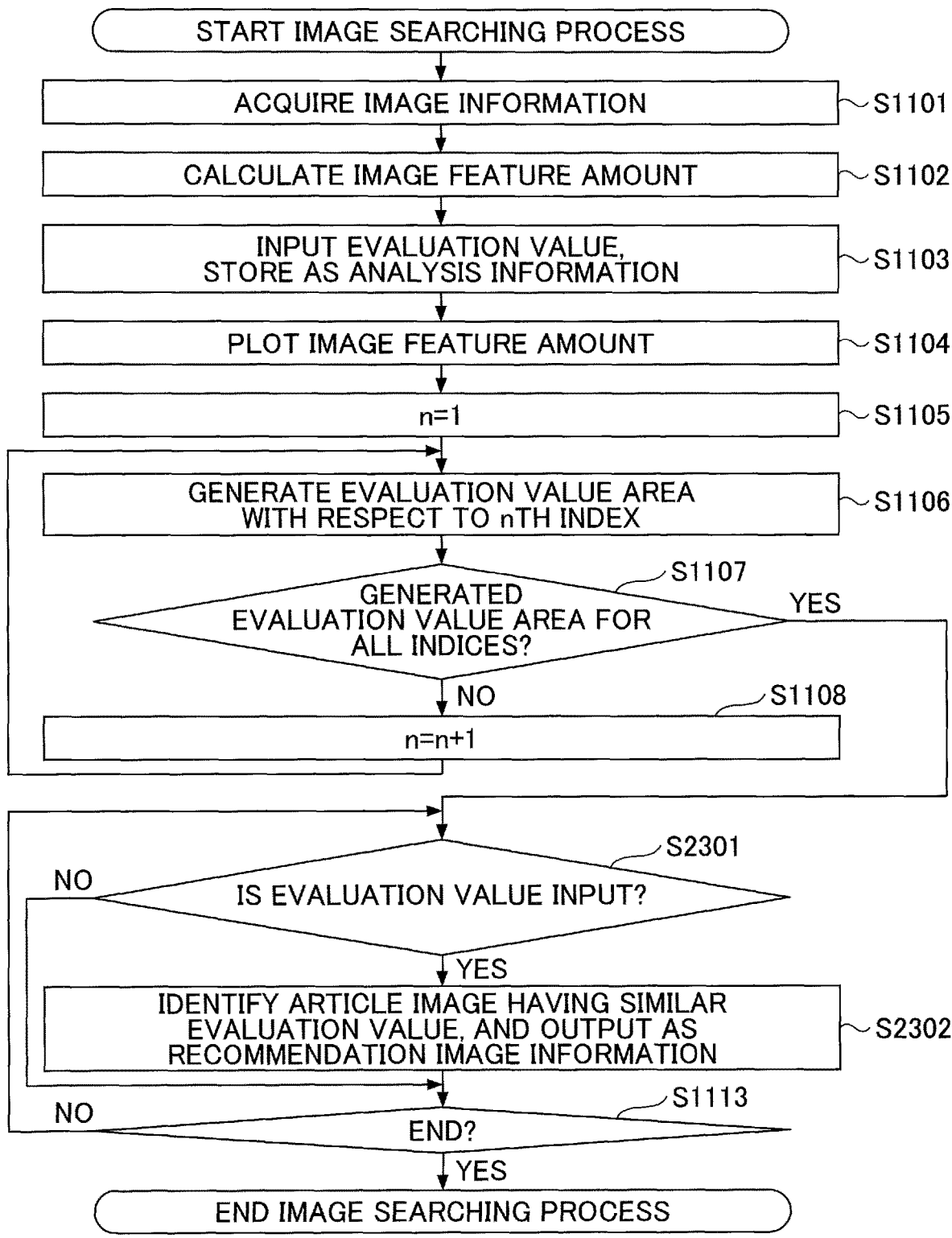
FIG. 23 is a flowchart illustrating the flow of an image searching process by the image searching apparatus according to the fifth embodiment of the present invention.

Next, the flow of the image searching process by the image searching apparatus 120 will be described. FIG. 23 is a flowchart illustrating the flow of the image searching process by the image searching apparatus according to the fifth embodiment. The differences from the image searching process described with reference to FIG. 11 are steps S2301 and S2302.

In step S2301, the input unit 2111 determines whether an evaluation value has been input. When it is determined in step S2301 that no evaluation value has been input (NO in step S2301), the process proceeds to step S1113. On the other hand, when it is determined in step S2301 that the evaluation value has been input (YES in step S2301), the process proceeds to step S2302.

In step S2302, the image identifying unit 904 refers to the analysis information 600 stored in the analysis information storage unit 160, and identifies an article image having the same or similar evaluation value as the input evaluation value for each index. Furthermore, the image identifying unit 904 outputs the identified article image as recommendation image information to an external device.

<3. Summary—Fifth Embodiment>

As is apparent from the above description, in the image searching apparatus according to the fifth embodiment, instead of calculating the evaluation value for each index indicating the preference of the customer based on the evaluation image information, input of the evaluation value is accepted directly from the customer. Thus, according to the image searching apparatus according to the fifth embodiment, the same effect as in the first embodiment can be achieved.

Sixth Embodiment

In a sixth embodiment, a case where the image searching apparatus 120 according to the fifth embodiment is applied to an advertisement data generation system will be described. In the advertisement data generation system referred to here, an advertisement image corresponding to the preference of a customer (in this case, an advertiser) is searched from a plurality of advertisement images (article images) stored in advance, and advertisement data is generated while presenting the found advertisement image to the customer.

<1. System Configuration of Advertisement Data Generation System—Sixth Embodiment>

Figure 24:
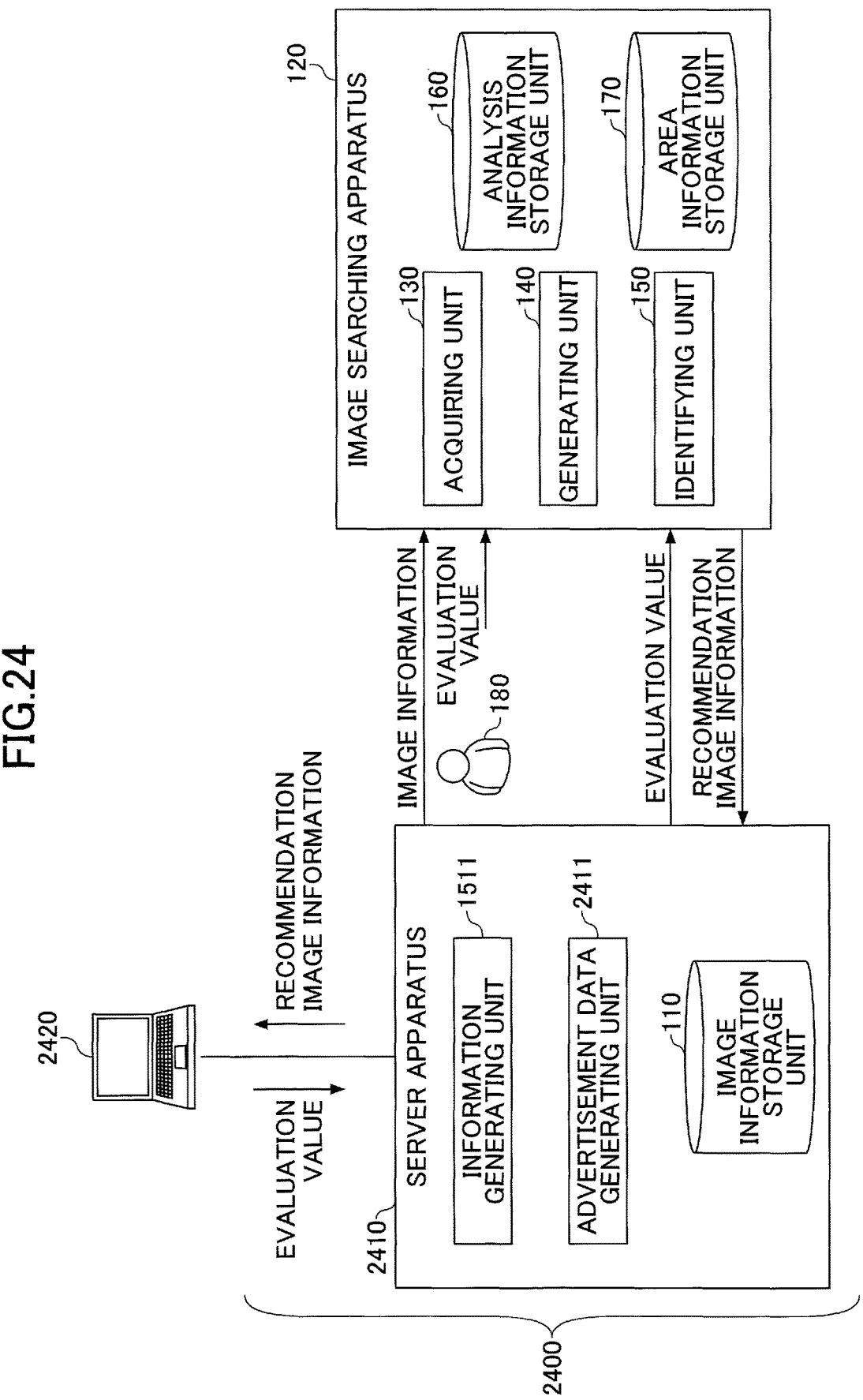
FIG. 24 is a diagram illustrating an example of the image searching apparatus according to the fifth embodiment being applied to an advertisement data generation system according to a sixth embodiment of the present invention.

First, a system configuration of an advertisement data generation system to which the image searching apparatus 120 according to the fifth embodiment is applied, will be described. FIG. 24 is a diagram illustrating an example of the image searching apparatus according to the fifth embodiment applied to an advertisement data generation system.

As illustrated in FIG. 24, an advertisement data generation system 2400 includes a server apparatus 2410, and is connected to the image searching apparatus 120. An advertisement data generation program is installed in the server apparatus 2410, and by executing the program, the server apparatus 2410 functions as the information generating unit 1511 and an advertisement data generating unit 2411.

The information generating unit 1511 transmits image information including all advertisement images registered in advance, from the image information storage unit 110, to the image searching apparatus 120. It is assumed that related information is added to the advertisement images registered in advance. The related information here includes a briefing sheet (a document in which the advertisement target and requirements, etc., are put together) used when the advertisement data is generated, and image data (original image, processed image, and processed recipes, etc.) used for the advertisement.

Note that with respect to the advertisement image included in the image information transmitted by the information generation unit 1511, the image searching apparatus 120 accepts an evaluation value for each index input by the administrator 180 of the advertisement image.

The advertisement data generating unit 2411 generates advertisement data according to an instruction from the customer. Specifically, the advertisement data generating unit 2411 displays the input screen 2200 on a terminal 2420 and acquires a request for the advertisement data by the customer (the user of the terminal 2420), as the evaluation value for each index indicating the preference of the customer. Furthermore, the advertisement data generating unit 2411 transmits the acquired evaluation value for each index, to the image searching apparatus 120.

The recommendation image information is transmitted from the image searching apparatus 120 in response to the advertisement data generating unit 2411 transmitting the evaluation value, and, therefore, the advertisement data generating unit 2411 receives this recommendation image information. Furthermore, the advertisement data generating unit 2411 transmits the received recommendation image information to the terminal 2420, and displays the recommendation image information to the customer.

Accordingly, the customer can view the advertisement images having the same or similar evaluation values as the input evaluation value for each index. That is, according to the advertisement data generation system 2400, it is possible to implement recommendations corresponding to the preference of the customer. As a result, the possibility that the customer can efficiently generate advertisement data corresponding to the preference of the customer, will increase.

<2. Flow of Recommendation Image Information Output Process in Advertisement Data Generation System—Sixth Embodiment>

Figure 25:
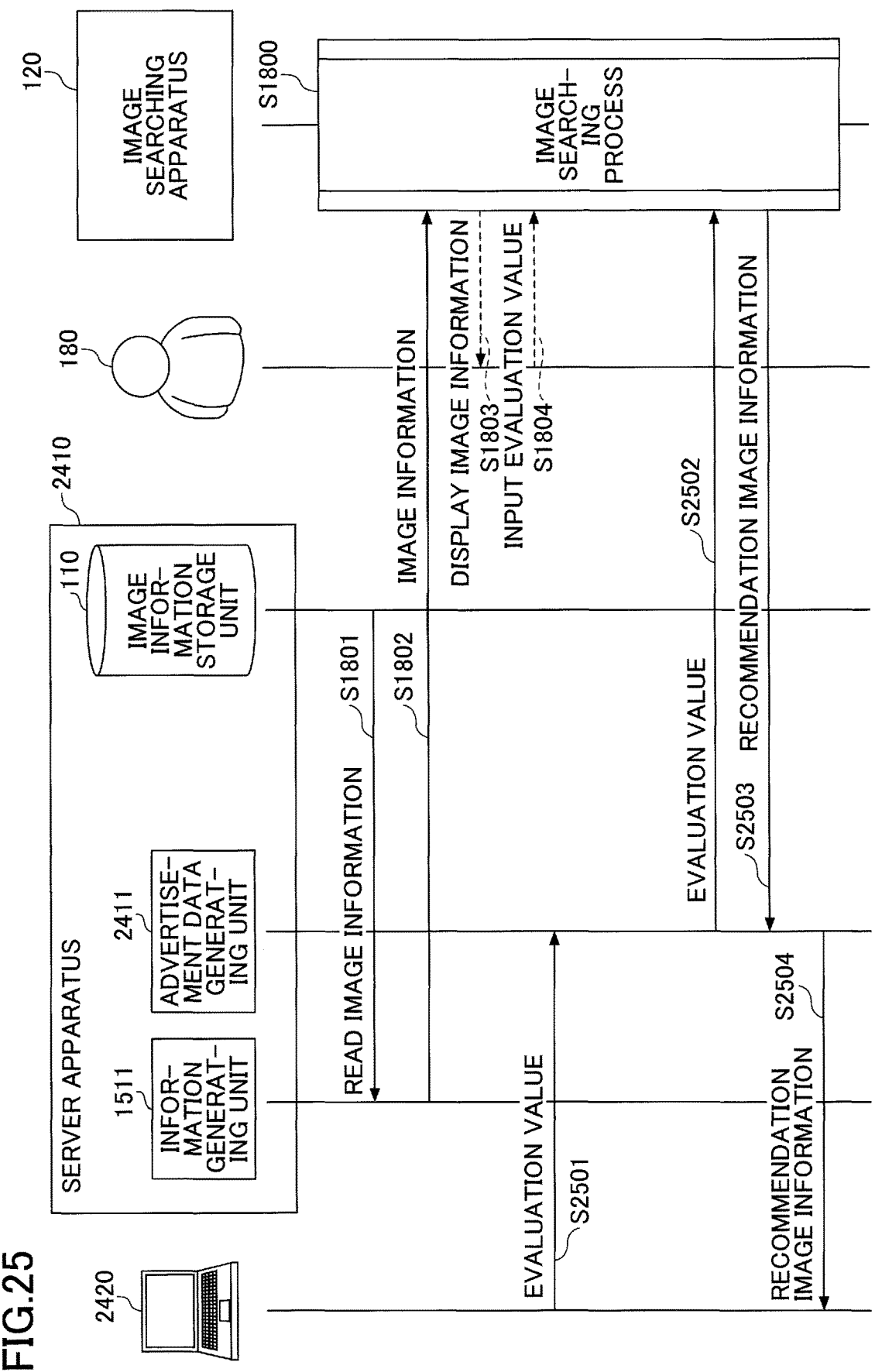
FIG. 25 is a sequence diagram illustrating the flow of a recommendation image information output process in the advertisement data generation system according to the sixth embodiment of the present invention.

Next, a flow of a recommendation image information output process in the advertisement data generation system 2400 will be described. FIG. 25 is a sequence diagram illustrating the flow of a recommendation image information output process in the advertisement data generation system. The differences from the sequence diagram illustrated in FIG. 18 are steps S2501 to S2504.

In step S2501, when there is access from the terminal 2420, the advertisement data generating unit 2411 transmits the input screen 2200 to the terminal 2420. Furthermore, when the evaluation value for each index is transmitted from the terminal 2420 in response to the advertisement data generation unit 2411 transmitting the input screen 2200, the advertisement data generating unit 2411 receives the evaluation value.

In step S2502, the advertisement data generating unit 2411 transmits the received evaluation value for each index to the image searching apparatus 120.

In step S2503, the advertisement data generating unit 2411 receives the recommendation image information from the image searching apparatus 120. In step S2504, the advertisement data generating unit 2411 transmits the received recommendation image information to the terminal 2420.

<3. Summary—Sixth Embodiment>

As is apparent from the above description, the advertisement data generation system 2400 to which the image searching apparatus 120 is applied, has the following functions.

At the time of generating advertisement data, a request with respect to advertisement data by the customer is acquired as an evaluation value for each index.

The recommendation image information transmitted from the image searching apparatus according to the acquired evaluation value, is transmitted to the terminal receiving the advertisement data.

Accordingly, the customer can view an advertisement image having the same or similar evaluation value as the input evaluation value for each index. That is, according to the advertisement data generation system, it is possible to implement recommendations corresponding to the preference of the customer. Accordingly, the possibility that the customer can efficiently generate advertisement data corresponding to the preference of the customer, will increase.

Note that in the present embodiment, the case where the customer directly inputs the evaluation value for each index has been described. However, as in the third and fourth embodiments, it is also possible to adopt a configuration in which an image expressing the customer's preference is used.

Other Embodiments

In the above embodiments, it has been described that similar indices are used in the case where the image searching apparatus 120 is applied to the purchasing system and in the case where the image searching apparatus 120 is applied to the advertisement data generation system. However, the indices to be used may be changed, for each system to which the image searching apparatus 120 is applied. For example, in the case of the advertisement data generation system, in addition to qualitative indices for advertisement images, indices such as advertisement type, industry type, appeal axis, goal, and target persona, etc., may be included. Note that the advertisement type refers to a brand advertisement, a campaign advertisement, and a product announcement, etc. Furthermore, the appeal axis refers to price appeal, needs appeal, and enlightenment appeal, etc. Furthermore, persona refers to age, gender, family composition, and income, etc.

Furthermore, even if the system to which the image searching apparatus 120 is to be applied is the same, the index to be used may be changed. For example, even in the same purchasing system, the index to be used may be changed for each type of product.

Furthermore, in the first to fourth embodiments, the method of calculating the evaluation value in the case where the evaluation image information includes a plurality of images expressing the customer's preference, is not described in detail; however, various calculation methods are conceivable as the method of calculating the evaluation value when a plurality of images is included. For example, evaluation values calculated based on a plurality of images may be simply averaged for each index, and the recommendation image information may be output based on the average evaluation value. Alternatively, the evaluation values calculated based on a plurality of images, may be aggregated into several patterns according to similar tendencies, and recommendation image information may be output for each pattern.

Furthermore, in the second embodiment, the case of using a radar chart as a method of searching for article images having the same or similar evaluation values, has been described. However, the method of searching for article images having the same or similar evaluation values is not limited as such. For example, the searching may be performed by using the Euclidean distance, the Mahalanobis' distance, a cosine similarity degree, or a Pearson correlation coefficient, etc.

Furthermore, in the fourth embodiment, the case where captured image information is transmitted as evaluation image information has been described. However, among the areas in the respective captured images included in the captured image information, areas in which the article identified by information indicating the product type may be extracted, and captured image information, which includes a partial image corresponding to the extracted areas, may be transmitted as evaluation image information.

Furthermore, in the third and sixth embodiments, in applying the image searching apparatus 120 to the purchasing system or the advertisement data generating system, some or all of the functions of the image searching apparatus 120 may be implemented in the server apparatus. Alternatively, a part or all of the functions of the server apparatus may be implemented in the image searching apparatus 120.

According to one embodiment of the present invention, it is possible to implement recommendations corresponding to the preference of a customer.

The image searching apparatus, the printed material, and the image searching method are not limited to the specific embodiments described in the detailed description, and variations and modifications may be made without departing from the spirit and scope of the present invention.

What is claimed is:

1. An image searching apparatus comprising:
a processor configured to:
calculate an evaluation value that indicates a preference of a customer, by using an image feature amount based on an image of each of a first set of a plurality of articles; and
identify an image to be recommended to the customer by using the calculated evaluation value, from among images of a second set of a plurality of articles,
wherein the processor is configured to:
generate a plurality of evaluation value areas for a plurality of different indexes by classifying plotting results having a same evaluation values for each of the plurality of indexes, with respect to the plotting results obtained by plotting the image feature amounts of the first set of the plurality of articles in a feature amount space, and
calculate the evaluation value with respect to an image selected by the customer, by comparing the image feature amount calculated based on the image selected by the customer with the plurality of evaluation value areas for the plurality of different indexes,
wherein the processor is configured to generate the image feature amount by acquiring at least one of a color histogram, a Local Binary Pattern (LBP) image feature amount, a Scale-Invariant Feature Transform (SIFT) image feature amount, and a Histogram of Oriented Gradient (HOG) image feature amount.

2. The image searching apparatus according to claim 1, wherein the processor is further configured to:
acquire the evaluation values of the respective plurality of articles, obtained by evaluating the plurality of articles based on each of one or more indices indicating an impression of each of the plurality of articles, and to acquire the image feature amounts of the respective plurality of articles calculated based on the images of the plurality of articles; and
generate the plurality of evaluation value areas for each of the one or more indices, by classifying together the image feature amounts of the respective plurality of articles having the same evaluation value, for each of the one or more indices, wherein
the processor identifies, as the image to be recommended to the customer, an image of an article having a similar evaluation value as the calculated evaluation value, from among the images of the plurality of the articles.

3. The image searching apparatus according to claim 2, wherein the processor identifies, as the image to be recommended to the customer, an image of an article having a similar evaluation value as the calculated evaluation value, based on a shape of a radar chart generated by connecting the evaluation values for the one or more indices by using the one or more indices as axes.

4. The image searching apparatus according to claim 2, wherein the processor calculates the evaluation value for each of the one or more indices, by comparing the image feature amount calculated based on the image selected by the customer, with the plurality of the evaluation value areas, by plotting, in a feature amount space, the image feature amount calculated based on the image selected by the customer.

5. The image searching apparatus according to claim 1, wherein the image selected by the customer includes an image associated with purchase history information of the customer.

6. The image searching apparatus according to claim 4, wherein the processor is further configured to:
output the image to be recommended to the customer.

7. The image searching apparatus according to claim 5, wherein the processor is further configured to:
print the image to be recommended to the customer, and create a printed material to be transmitted to the customer.

8. The image searching apparatus according to claim 2, wherein the processor is further configured to:
input the evaluation value for each of the one or more indices, wherein
the processor identifies, as the image to be recommended to the customer, an image of an article having a similar evaluation value as the input evaluation value.

9. An image searching method comprising:
calculating an evaluation value that indicates a preference of a customer, by using an image feature amount based on an image of each of a first set of a plurality of articles;
identifying an image to be recommended to the customer by using the calculated evaluation value, from among images of a second set of a plurality of articles,
generating a plurality of evaluation value areas for a plurality of different indexes by classifying plotting results having a same evaluation values for each of the plurality of indexes, with respect to the plotting results obtained by plotting the image feature amounts of the first set of the plurality of articles in a feature amount space,
calculating the evaluation value with respect to an image selected by the customer, by comparing the image feature amount calculated based on the image selected by the customer with the plurality of evaluation value areas for the plurality of different indexes, and
generating the image feature amount by acquiring at least one of a color histogram, a Local Binary Pattern (LBP) image feature amount, a Scale-Invariant Feature Transform (SIFT) image feature amount, and a Histogram of Oriented Gradient (HOG) image feature amount.

10. A non-transitory computer-readable recording medium storing an image searching program that causes a computer to execute a process, the process comprising:
calculating an evaluation value that indicates a preference of a customer, by using an image feature amount based on an image of each of a first set of a plurality of articles;
identifying an image to be recommended to the customer by using the calculated evaluation value, from among images of a second set of a plurality of articles,
generating a plurality of evaluation value areas for a plurality of different indexes by classifying plotting results having a same evaluation values for each of the plurality of indexes, with respect to the plotting results obtained by plotting the image feature amounts of the first set of the plurality of articles in a feature amount space, and
calculating the evaluation value with respect to an image selected by the customer, by comparing the image feature amount calculated based on the image selected by the customer with the plurality of evaluation value areas for the plurality of different indexes, and
generating the image feature amount by acquiring at least one of a color histogram, a Local Binary Pattern (LBP) image feature amount, a Scale-Invariant Feature Transform (SIFT) image feature amount, and a Histogram of Oriented Gradient (HOG) image feature amount.

11. The image searching apparatus according to claim 1, wherein the first set of the plurality of articles are different from the second set of the plurality of articles.

* * * * *